United States Patent
Tomari et al.

(10) Patent No.: US 9,102,822 B2
(45) Date of Patent: Aug. 11, 2015

(54) ROLL MEMBER, CHARGING UNIT, PROCESS CARTRIDGE AND IMAGE FORMING APPARATUS

(75) Inventors: Shogo Tomari, Kanagawa (JP); Minoru Rokutan, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 179 days.

(21) Appl. No.: 13/232,332

(22) Filed: Sep. 14, 2011

(65) Prior Publication Data
US 2012/0243909 A1 Sep. 27, 2012

(30) Foreign Application Priority Data
Mar. 25, 2011 (JP) ................................. 2011-068563

(51) Int. Cl.
*G03G 15/02* (2006.01)
*B25F 5/02* (2006.01)
*C08L 23/10* (2006.01)
*C08L 21/00* (2006.01)
*C08L 23/28* (2006.01)

(52) U.S. Cl.
CPC ................. *C08L 23/10* (2013.01); *C08L 21/00* (2013.01); *C08L 23/28* (2013.01); *G03G 15/0233* (2013.01)

(58) Field of Classification Search
USPC ........................................... 399/176; 492/56
See application file for complete search history.

(56) References Cited

U.S. PATENT DOCUMENTS

| | | | |
|---|---|---|---|
| 5,007,964 A * | 4/1991 | Tsukisaka et al. | 106/464 |
| 5,597,652 A | 1/1997 | Utsunomiya et al. | |
| 5,625,858 A * | 4/1997 | Hirai et al. | 399/176 |
| 6,342,100 B1 * | 1/2002 | Nover et al. | 106/464 |
| 6,853,820 B2 * | 2/2005 | Saito et al. | 399/109 |
| 7,141,183 B2 * | 11/2006 | Hattori et al. | 252/500 |
| 2004/0057749 A1 | 3/2004 | Saito et al. | |
| 2004/0062940 A1 | 4/2004 | Miyamori et al. | |
| 2004/0135129 A1 | 7/2004 | Hattori et al. | |
| 2005/0175374 A1 * | 8/2005 | Kosuge | 399/168 |
| 2006/0167159 A1 * | 7/2006 | Kubota et al. | 524/439 |

FOREIGN PATENT DOCUMENTS

| | | |
|---|---|---|
| CN | 1475865 A | 2/2004 |
| CN | 1484087 A | 3/2004 |
| CN | 1743970 A | 3/2006 |
| JP | H09-031331 A | 2/1997 |
| JP | A-10-177288 | 6/1998 |
| JP | A-2004-125823 | 4/2004 |
| JP | 2009-128781 A | 6/2009 |
| JP | 2011-017935 A | 1/2011 |

OTHER PUBLICATIONS

Dec. 16, 2014 Office Action issued in Japanese Application No. 2011-068563.
Apr. 15, 2015 Office Action issued in Chinese Application No. 201110350129.1.

* cited by examiner

*Primary Examiner* — Erika J Villaluna
(74) *Attorney, Agent, or Firm* — Oliff PLC

(57) ABSTRACT

Disclosed is a roll member including a core, and an elastic layer arranged on the core, the elastic layer containing a rubber material and polyalphaolefin.

14 Claims, 2 Drawing Sheets

ROLL MEMBER, CHARGING UNIT, PROCESS CARTRIDGE AND IMAGE FORMING APPARATUS

CROSS-REFERENCE TO RELATED APPLICATIONS

This application is based on and claims priority under 35 USC 119 from Japanese Patent Application No. 2011-068563 filed Mar. 25, 2011.

BACKGROUND

Technical Field

The present invention relates to a roll member, a charging unit, a process cartridge and an image forming apparatus.

SUMMARY

According to an aspect of the invention, there is provided a roll member including a core, and an elastic layer arranged on the core, the elastic layer containing a rubber material and polyalphaolefin.

BRIEF DESCRIPTION OF THE DRAWINGS

Exemplary embodiments of the present invention will be described in detail based on the following figures, wherein.

DETAILED DESCRIPTION

[Roll Member]

Figure 1:
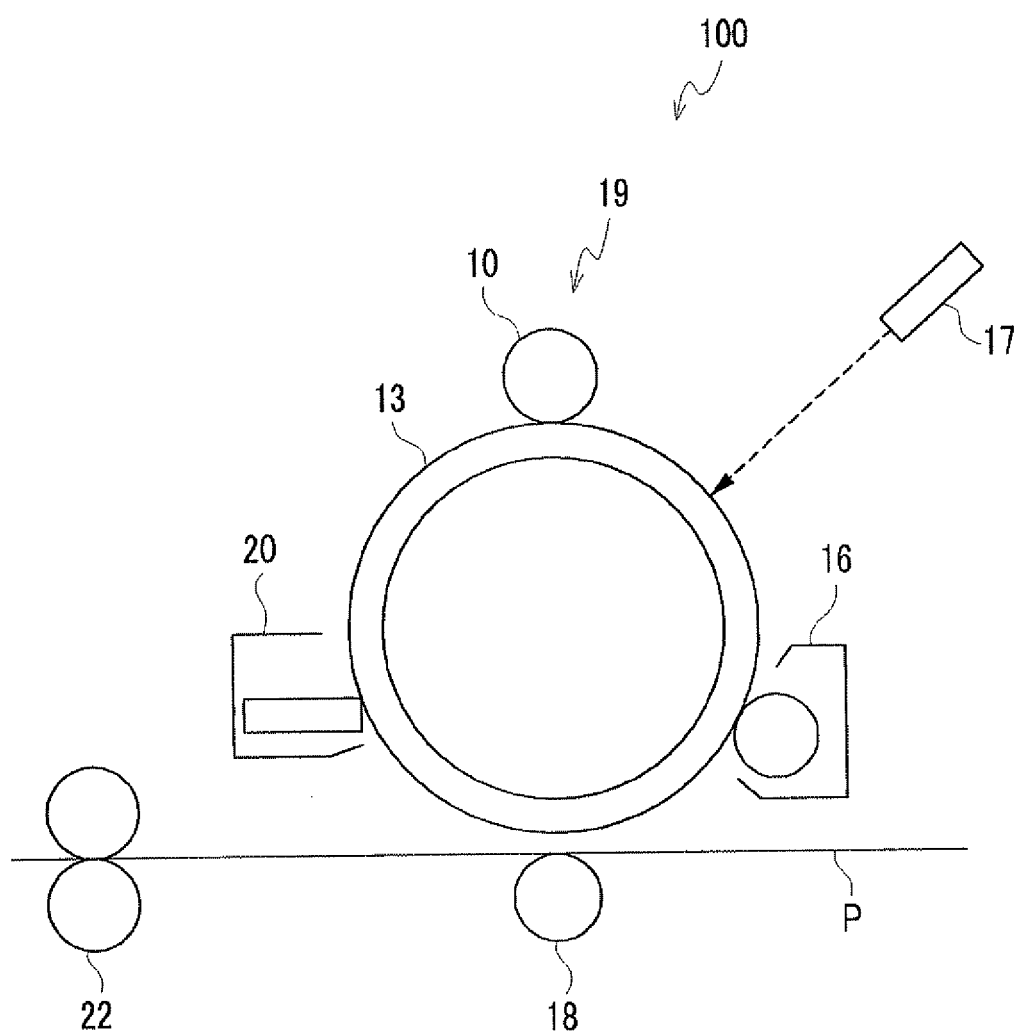
FIG. 1 is a schematic view illustrating an image forming apparatus according to an exemplary embodiment.

The roll member according to the exemplary embodiment includes a core and an elastic layer arranged on the core.

In addition, the elastic layer contains a rubber material and polyalphaolefin.

Specifically, the elastic layer is, for example, a vulcanized material of unvulcanized rubber composition which contains an unvulcanized rubber material and polyalphaolefin, and optionally contains other additives.

Here, a roll member including the elastic layer (i.e., rubber layer) containing the rubber material is gradually deformed over time due to contraction of the rubber material constituting the elastic layer, the circularity of the roll member or terminal protrusion as the surface property of the elastic layer is deteriorated, and the intended shape cannot be thus obtained.

In this regard, the roll member according to the exemplary embodiment has this composition and deformation of the elastic layer is thus suppressed.

The reason is not clear, but it is thought that polyalphaolefin as a thermoplastic resin is incorporated to the elastic layer composed of the rubber material, polyalphaolefin homogeneously dispersed in the rubber material is cooled after molding, and thus loses flowability and obtains stability, but the stability of polyalphaolefin is stronger than the contraction strength of the rubber and contraction of the rubber material is thus suppressed.

In addition, as a result, the roll member according to the exemplary embodiment is for example a roll member in which deterioration in circularity of the roll member or deterioration in terminal protrusion as surface property of the elastic layer is suppressed.

The term "terminal protrusion" as used herein means a phenomenon caused by the contraction of rubber material when the rubber material is extruded.

In particular, deformation of the elastic layer composed of the rubber material due to contraction of the rubber material should be reduced in order to obtain a roll member having a high accuracy which eliminates the necessity of subsequent treatment by forming an elastic layer through extrusion molding. In this regard, the roll member according to the exemplary embodiment is useful.

In addition, it is known in related art that a plasticizer or a softener is incorporated in the elastic layer composed of the rubber material in order to suppress contraction of rubber materials. A bleeding phenomenon in which the plasticizer or softener is precipitated from the elastic layer may occur. The polyalphaolefin is a polymer known as a thermoplastic resin, thus inhibiting the bleeding phenomenon in which the polyalphaolefin is precipitated from the elastic layer. In this regard, the roll member according to the exemplary embodiment is useful.

In addition, in the roll member according to the exemplary embodiment, incorporation of the softener or plasticizer causing the bleeding phenomenon in the elastic layer may be omitted.

When the roll member according to the exemplary embodiment having these characteristics is applied to a member such as a charging unit for image forming apparatuses, the charging unit exhibits suppression in charging defects caused by deformation of the elastic layer of the roll member. When the charging unit is provided in an image forming apparatus (or process cartridge), the image forming apparatus (or process cartridge) exhibits suppression in image defects caused by charging defects.

Here, in the roll member according to the exemplary embodiment, the elastic layer further contains carbon black having a DBP oil absorption amount of from 42 ml/100 g to 175 ml/100 g.

When carbon black is incorporated in the elastic layer, the carbon black functions as a filler and thus facilitates suppression of contraction of the rubber material.

However, carbon black exhibits high electrical conductivity and thus electric field dependence of the electrical resistance. For this reason, electric resistance of carbon black may be varied by an applied voltage.

In this regard, in the roll member according to the exemplary embodiment, in a case where carbon black is incorporated in the elastic layer, the electrical field dependence of the electrical resistance can be suppressed by using carbon black having a DBP oil absorption amount in the range above.

This is thought to be due to the reason that, since the level of DBP oil absorption is to a certain extent proportional to the structure growth level of carbon black, as the structure increases, the distance between carbon black decreases and the carbon black thus exhibits electrical conductivity behavior.

In addition, in the roll member according to the exemplary embodiment, the elastic layer contains at least one selected from quinoxaline compounds and triazine compounds, or further contains organic peroxide. When the elastic layer uses a rubber material having a halogen group as a rubber material (unvulcanized rubber material), the quinoxaline and triazine compounds are incorporated.

The polyalphaolefin is a thermoplastic resin and is softened by heat. Accordingly, when the polyalphaolefin is incorporated in the elastic layer, compression permanence distortion, the property of elastic layer may be deteriorated. This is thought to be due to the reason that the polyalphaolefin incorporated when the elastic layer is formed, that is, an unvulcanized rubber composition is vulcanized, does not form a cross-linked structure, enabling this deformation to be recovered.

In this regard, in the roll member according to the exemplary embodiment, when at least one selected from quinoxaline and triazine compounds, or organic peroxide is incorporated as a vulcanizer to the elastic layer, deterioration in the compression permanence distortion property of the elastic layer is suppressed.

This is thought to be due to the reason that, in a case where at least one selected from quinoxaline and triazine compounds is incorporated as the vulcanizer in the elastic layer, when the unvulcanized rubber composition (a rubber material having a halogen group as the rubber material (the unvulcanized rubber material), when the vulcanizer is applied)) is vulcanized, halogen groups are extracted by an acid acceptor and a quinoxaline or triazine compound is then reacted (cross-linked), but the halogen groups are relatively rich and cross-linkage density thus increases and the compression permanence distortion is reduced.

In addition, in the roll member according to the exemplary embodiment, the elastic layer further contains calcium carbonate having a BET specific surface area of from 11 $m^2/g$ to 70 $m^2/g$ (or from about 11 $m^2/g$ to about 70 $m^2/g$), in addition to carbon black.

As described above, carbon black exhibits superior electrical conductivity and thus electrical field dependence of the electrical resistance. For this reason, the electric resistance of carbon black may be varied by an applied voltage.

In this regard, in the roll member according to the exemplary embodiment, carbon black is incorporated in the elastic layer, and, in addition to the carbon black, calcium carbonate having the BET specific surface area of from 11 $m^2/g$ to 70 $m^2/g$ within the range defined above is further incorporated therein to suppress dependency of electric resistance on the electric field.

This is thought to be due to the reason that, although a great amount of carbon black having a high DBP oil absorption amount may be preferably incorporated in order to improve moldability, the carbon black has a limitation due to the influence of electric field-dependency, while calcium carbonate reinforces the rubber material due to BET specific surface area and has little or no effect on electric field-dependency, thus exhibiting superior moldability comparable to carbon black.

In addition, the roll member according to the exemplary embodiment is not limited to the configuration defined above and may for example have a configuration further including an intermediate layer interposed between the elastic layer and the core, a surface layer provided on the elastic layer, a resistance control layer interposed between the elastic layer and the surface layer, and a protective layer provided on the outer side (outermost surface) of the surface layer. In addition, the roll member according to the exemplary embodiment may have a configuration including only a core and an elastic layer.

Hereinafter, constituent components of the roll member according to the exemplary embodiment will be described in detail.

(Core)

The core is a cylindrical member which functions as an electrode and support member of a roll member. Examples of the core include metals such as iron (such as free-cut iron), copper, brass, stainless steel, aluminum and nickel. In addition, examples of the core include members whose outer surface is plated (such as resin or ceramic members) and members in which a conductive agent is dispersed (such as resin or ceramic members). The core may be a hollow (cylindrical) member or a non-hollow member.

(Elastic Layer)

The elastic layer contains a rubber material and polyalphaolefin and optionally contains other additives. Specifically, the elastic layer is for example composed of a vulcanized substance of an unvulcanized rubber composition which contains an unvulcanized rubber material, and polyalphaolefin and optionally contains other additives.

—Rubber Material—

The rubber material is for example an elastic material which has at least a double bond in a chemical structure thereof.

Specifically, examples of rubber material include isoprene rubbers, chloroprene rubbers, epichlorohydrin rubbers, butyl rubbers, polyurethane, silicone rubbers, fluorine rubbers, styrene-butadiene rubbers, butadiene rubbers, nitrile rubbers, ethylene propylene rubbers, epichlorohydrin-ethylene oxide copolymer rubbers, epichlorohydrin-ethylene oxide-allyl glycidyl ether copolymer rubbers, ethylene-propylene-diene terpolymer rubbers (EPDM), acrylonitrile-butadiene copolymer rubbers (NBR), natural rubbers and combinations thereof.

Of these rubber materials, polyurethane, EPDM, epichlorohydrin-ethylene oxide copolymer rubbers, epichlorohydrin-ethylene oxide-allyl glycidyl ether copolymer rubbers, NBR, and combinations thereof are preferred.

The rubber material may be foamed or unfoamed.

—Polyalphaolefin—

The polyalphaolefin is for example a homopolymer selected from olefin hydrocarbons having 2 to 8 carbon atoms (preferably having 3 to 6 carbon atoms, more preferably having 3 to 4 carbon atoms), or a copolymer of two or more types thereof.

Specifically, preferable examples of the olefin hydrocarbon include propylene, ethylene, 1-butene, 2-methyl propylene, 2-methyl-1-butene, 2-ethyl-1-butene, 3-methyl-1-butene, 1-pentene, 2-methyl-1-pentene, 3-methyl-1-pentene, 4-methyl-1-pentene, 2-ethyl-1-pentene, 3-ethyl-1-pentene, 4-ethyl-1-pentene, and 1-hexene.

Of these polyalphaolefins composed of a homopolymer of olefin hydrocarbon or a copolymer thereof, at least one selected from propylene polymers, copolymers of propylene and ethylene, and butene polymers are preferred from viewpoint of inhibiting deformation of the elastic layer. The reason is that these materials have a melting temperature region suitable to a molding process temperature.

The weight average molecular weight of polyalphaolefin is for example 2,000 or more, preferably from 8,000 to 150,000, more preferably from 30,000 to 100,000.

When the weight average molecular weight is within this range, deformation of the elastic layer can be readily inhibited.

The content of polyalphaolefin is, for example, from 1 part by weight to 40 parts by weight (or from about 1 part by weight to about 40 parts by weight), preferably from 3 parts by weight to 30 parts by weight (or from about 3 parts by weight to about 30 parts by weight), more preferably from 5 parts by weight to 20 parts by weight (or from about 5 parts by weight to about 20 parts by weight), based on 100 parts by weight of the rubber material.

When the content is within this range, deformation of elastic layer can be readily inhibited.

—Other Additives—

Examples of the other additives include carbon black having a DBP oil absorption amount within the range as defined above (hereinafter, referred to as "specific carbon black"), calcium carbonate having a BET specific surface area within the range as defined above (hereinafter, referred to as "specific calcium carbonate"), and quinoxaline compounds and triazine compounds.

The specific carbon black will be described.

The specific carbon black is a carbon black having a DBP oil absorption amount of from 42 ml/100 g to 175 ml/100 g (or from about 42 ml/100 g to about 175 ml/100 g), preferably from 60 ml/100 g to 150 ml/100 g (or from about 60 ml/100 g to about 150 ml/100 g), more preferably from 85 ml/100 g to 130 ml/100 g (or from about 85 ml/100 g to about 130 ml/100 g).

In a case where carbon black is incorporated in the elastic layer, when specific carbon black is incorporated as the carbon black in the elastic layer, it is easy to inhibit electrical field dependence of the electrical resistance of the roll member (elastic layer).

In addition, the specific carbon black may be incorporated as a conductive agent or filler in the elastic layer.

The DBP oil absorption amount of specific carbon black refers to an amount of dibutyl phthalate (DBP) adsorbed in 100 g of carbon black and is defined by D2414-6 TT ASTM (American Standard Test method).

The content of specific carbon black is for example from 5 parts by weight to 50 parts by weight, preferably from 10 parts by weight to 40 parts by weight, more preferably from 15 parts by weight to 30 parts by weight, based on 100 parts by weight of the rubber material.

When the content is within this range, it is easy to inhibit electrical field dependence of the electrical resistance of the roll member (elastic layer).

The specific calcium carbonate will be described.

The specific calcium carbonate is calcium carbonate which has a BET specific surface area of from 11 $m^2/g$ to 70 $m^2/g$ (preferably BET specific surface area of from 13 $m^2/g$ to 70 $m^2/g$ and more preferably BET specific surface area of from 18 $m^2/g$ to 70 $m^2/g$).

When the carbon black is incorporated in the elastic layer, incorporation of the specific calcium carbonate in combination with the carbon black in the elastic layer is preferred since it has no effect on electric field dependence of the electric resistance of the roll member (elastic layer).

Here, carbon black incorporated together with specific calcium carbonate in the elastic layer may be any of carbon black other than specific carbon black and may be more preferably specific carbon black from viewpoint of suppressing electrical field dependence of the electrical resistance of the roll member (elastic layer).

For example, lime stone is baked together with anthracite or cokes in a lime baking furnace to obtain quicklime (calcium oxide), water is added to the quicklime to obtain lime milk and the lime milk is reacted with carbon dioxide generated during backing of lime stone, to produce calcium carbonate having uniform particles. In this regard, the BET specific surface area may be adjusted by production reaction conditions or surface-treatment with an organic substance.

In addition, the BET specific surface area is measured in accordance with a BET method (method for calculating surface area per 1 g from an amount of nitrogen absorbed) which is based on a method defined by JIS6217.

The specific calcium carbonate may be surface-treated from a viewpoint of improving dispersibility of the rubber material.

The surface treatment is carried out using fatty acid (such as caproic acid, caprylic acid, lauric acid, myristic acid, palmitic acid, stearic acid, behenic acid, palmitoleic acid, oleic acid, erucic acid), metal salts (such as, alkaline metal salts (such as sodium salts or potassium salts) of fatty acid, or alkaline earth metal salts (such as magnesium salts or calcium salts) of fatty acid, or esters (such as stearyl stearate, lauryl stearate, stearyl palmitate, lauryl palmitate).

The content of specific calcium carbonate is for example, from 20 parts by weight to 100 parts by weight, and is preferably from 30 parts by weight to 80 parts by weight and more preferably from 40 parts by weight to 60 parts by weight, based on 100 parts by weight of the rubber material.

When the content is within this range, electrical field dependence of the electrical resistance of the roll member (elastic layer) can be easily suppressed.

In addition, the specific calcium carbonate may be used in combination with other calcium carbonate.

The quinoxaline and triazine compounds will be described.

The quinoxaline and triazine compounds function as vulcanizers when a rubber material having a halogen group is used as a rubber material.

Examples of the quinoxaline compound include quinoxaline 2,3-dithiocarbonate, 6-methylquinoxaline 2,3-dithiocarbonate, 6-isopropylquinoxaline 2,3-dithiocarbonate, and 5,8-dimethylquinoxaline dithiocarbonate.

Of these, 6-methylquinoxaline 2,3-dithiocarbonate is preferred from a viewpoint of inhibiting deterioration of compression permanence distortion of the elastic layer.

Examples of the triazine compound include 2,4,6-trimercapto-1,3,5-triazine, 1-methoxy-3,5-dimercapto triazine, 1-hexyl amino-3,5-dimercapto triazine, 1-diethyl amino-3,5-dimercapto triazine, 1-cyclohexyl amino-3,5-dimercapto triazine, 1-dibutyl amino-3,5-dimercapto triazine, 2-anilino-4,6-dimercapto triazine, and 1-phenyl amino-3,5-dimercapto triazine.

Of these, 2,4,6-trimercapto-1,3,5-triazine is preferred from viewpoint of inhibiting deterioration of compression permanence distortion of the elastic layer.

Here, examples of the rubber material having a halogen group applied when at least one selected from quinoxaline and triazine compounds is incorporated in the elastic layer, include chloroprene rubbers, epichlorohydrin rubbers, ethylene propylene rubbers, epichlorohydrine-ethylene oxide copolymer rubbers, epichlorohydrin-ethylene oxide-allyl glycidyl ether copolymer rubbers.

The content of at least one selected from quinoxaline and triazine compounds is for example from 0.1 part by weight to 10 parts by weight, preferably from 0.3 part by weight to 6.0 parts by weight, more preferably from 0.5 part by weight to 4.0 parts by weight, based on 100 parts by weight of the rubber material.

When the content is within this range, it is easy to inhibit electrical field dependence of the electrical resistance of the roll member (elastic layer).

Here, examples of other additives include, in addition to the materials, additives commonly added to the elastic layer, such as conductive agents (conductive agents other than the specific carbon black), vulcanizers (vulcanizers other than the quinoxaline and triazine compounds), vulcanization accelerators, antioxidants, surfactants, coupling agents, fillers (fillers other than specific calcium carbonate, specific carbon black), and acid acceptors. Hereinafter, representative additives will be exemplified.

The conductive agent is a known conductive material or an organic ionic conductive material. In addition, in this exemplary embodiment, the terms "conductive" and "conductivity" mean that volume resistivity is $10^4$ Ωcm or less.

Examples of the conductive material include quaternary ammonium salts (for example, lauryl trimethyl ammonium, stearyl trimethyl ammonium, octadodecyl trimethyl ammonium, dodecyl trimethyl ammonium, hexadecyl trimethyl ammonium, perchlorate such as modified fatty acid dimethyl ethyl ammonium, or the like, chlorates, hydrorate borofluorides, sulfates, ethosulfates, benzyl halides (benzyl bromide, benzyl chloride, or the like), aliphatic sulfonate, higher alcohol sulfate esters, higher alcohol ethylene oxide added sulfate esters, higher alcohol phosphate esters, higher alcohol ethylene oxide added phosphate esters, various betaines, higher alcohol ethylene oxides, polyethylene glycol aliphatic esters, polyol aliphatic esters, and the like.

Examples of the organic ion conductive material include complexes consisting of polyol (1,4 butanediol, ethylene glycol, polyethylene glycol, propylene glycol, polyethylene glycol, or the like) and its derivatives and metallic salts, and complexes consisting of monool (ethylene glycol monomethyl ether, ethylene glycol monoethyl ether, or the like) and metallic salts. Examples of the metallic salt include metallic salts in Group I in the periodic table such as $LiClO_4$, $LiCF_3SO_3$, $LiAsF_6$, $LiBF_4$, $NaClO_4$, NaSCN, KSCN, NaCl, or the like; electrolytes such as salts of $NH_4^+$; metallic salts in Group II in the periodic table such as $Ca(ClO_4)_2$, $Ba(ClO_4)_2$, or the like; metallic salts that possess groups having an active hydrogen that reacts with at least one or more of isocyanates such as hydroxyl group, carboxyl group, primary or secondary amine groups and the like. Specifically, examples of the complex include PEL (complexes of $LiClO_4$ and polyethylene glycol), and the like. The conductive agent may be used alone or in combination of two or more types.

The content of conductive agent when it is the conductive material is for example preferably from 1 part by weight to 80 parts by weight, more preferably from 15 parts by weight to 25 parts by weight, based on 100 parts by weight of the rubber material.

The content of conductive agent when it is the organic ionic conductive material is for example preferably from 0.5 part by weight to 15 parts by weight, more preferably from 0.5 part by weight to 3.0 parts by weight, based on 100 parts by weight of the rubber material.

Examples of the vulcanizer include vulcanizers to vulcanizing by extracting halogen groups, such as sulfur, 2,4,6-trimercapto-1,3,5-triazine, and 6-methylquinoxaline-2,3-dithiocarbamate. The vulcanizer may be used alone or in combination of two or more kinds thereof.

The content of vulcanizer is not particularly limited and is for example preferably from 0.1 part by weight to 10 parts by weight, more preferably from 0.3 part by weight to 5 parts by weight, based on 100 parts by weight of the rubber material.

Examples of sulfur vulcanization accelerators include thiazoles, sulfenamides, thiurams, dicarbamates and xanthates. The sulfur vulcanization accelerator may be used alone or in combination of two or more kinds thereof. In addition, a known rubber blending material such as zinc oxide or stearic acid may be further added. The material may be used alone or in combination of two or more kinds thereof.

The content of sulfur vulcanization accelerator is not particularly limited and is for example preferably from 0.1 part by weight to 10 parts by weight, more preferably from 0.3 part by weight to 5 parts by weight, based on 100 parts by weight of the rubber material.

Examples of the triazine and quinoxaline vulcanization accelerators include 1,8-diazabicyclo(5,4,0)undec-7-ene (hereinafter, simply referred to as "DBU") salts and 1,5-diazabicyclo(4,3,0)non-5-ene (hereinafter, simply referred to as "DBN") salts. Examples of DBU salts include DBU-carbonate, DBU-stearate, DBU-2-ethylhexanoate, DBU-benzoate, DBU-salicylate, DBU-3-hydroxy-2-naphthoate, DBU-phenolic resin salts, DBU-2-mercaptobenzothiazole salts, and DBU-2-mercaptobenzimidazole salts. Examples of DBN salts include DBN-carbonate, DBN-stearate, DBN-2-ethylhexanoate, DBN-benzoate, DBN-salicylate, DBN-3-hydroxy-2-naphthoate, DBN-phenolic resin salts, DBN-2-mercaptobenzothiazole salts, and DBN-2-mercaptobenzimidazole salts.

The content of triazine and quinoxaline vulcanization accelerators is not particularly limited and is for example preferably from 0.1 part by weight to 10 parts by weight, more preferably from 0.3 part by weight to 5 parts by weight, based on 100 parts by weight of the rubber material.

Examples of the acid acceptor include metal compounds and hydrotalcites.

Examples of metal compounds include oxide, hydroxide, carbonate, carboxylate, silicate, borate, or phosphite of an element in Group II (alkaline earth metal) of the periodic table; and oxides, basic carbonates, basic carboxylate, basic phosphites, or tribasic sulfate of an element in Group IV of the periodic table. Specifically, examples of the metal compounds include magnesium oxide, magnesium hydroxide, barium hydroxide, magnesium carbonate, barium carbonate, calcium oxide, calcium hydroxide, calcium carbonate, calcium silicate, calcium stearate, zinc stearate, calcium phthalate, calcium phosphite, zinc white, tin oxide, tin stearate and basic tin phosphite.

The content of the acid acceptor is not particularly limited and is for example preferably from 0.5 part by weight to 20.0 parts by weight, more preferably from 3.0 parts by weight to 10.0 parts by weight, based on 100 parts by weight of the rubber material.

Specifically, examples of the filler include calcium carbonate, carbon black, silica and the like. The inorganic filler may be used alone or in combination of two or more kinds thereof.

The content of filler is not particularly limited and is preferably from 1 part by weight to 80 parts by weight, more preferably from 10 parts by weight to 50 parts by weight, based on 100 parts by weight of the rubber material.

—Method for Forming Elastic Layer—

A method for forming the elastic layer will be described.

First, for example, an unvulcanized rubber composition which contains an unvulcanized rubber material, polyalphaolefin and optionally contains other additives is kneaded with a mixer such as a kneader. The kneaded unvulcanized rubber composition is coated in the form of a layer on the outer surface of the core by extrusion molding. The method for applying the kneaded rubber composition is not limited to extrusion molding and may be any of a variety of known methods. In addition, this unvulcanized rubber composition formed in a layer is vulcanized by heating to form an elastic layer. During heating, a heatable cylindrical die may be used.

—Physical Properties of Elastic Layer—

The thickness of the elastic layer is for example preferably from 1 mm to 10 mm, more preferably from 2 mm to 5 mm, although it may be varied depending on the intended application of the roll member.

The volume resistivity of the elastic layer may be varied depending on the intended application of the roll member. In a case where the elastic layer is applied to a charging unit of an electrophotographic image forming apparatus, the volume resistivity thereof is for example preferably from $10^4$ Ωcm to $10^{10}$ Ωcm, more preferably from $10^5$ Ωcm to $10^9$ Ωcm.

In addition, the volume resistivity of a sheet-type sample to be measured is obtained in accordance with the following equation using a test jig (R12702A/B resistivity chamber: manufactured by Advantest Corporation) and a high-resistance meter (R8340A digital ultra-high resistance/micro current meter: manufactured by Advantest Corporation), with a current obtained after a voltage controlled to allow an electric field (applied voltage/composition sheet thickness) to be adjusted to 1,000 V/cm, is applied for 30 seconds.

$$\text{volume resistivity}(\Omega\cdot\text{cm}) = (19.63 \times \text{applied voltage}(V))/(\text{current}(A) \times \text{thickness of measured sample sheet (cm)}) \quad \text{Equation}$$

In a case where the roll member is applied to a charging unit of an electrophotographic image forming apparatus, the hardness of the elastic layer is for example preferably Asker C hardness of from 15° to 90°, more preferably from 15° to 70°, although the hardness of the elastic layer may be varied depending on the intended application of the roll member.

In addition, measurement of Asker C hardness is carried out under a load of 1,000 g by pressing a test needle of an Asker C-type hardness meter (manufactured by Polymer Laboratories Inc.) on the surface of a measurement sheet with a thickness of 3 mm.

(Surface Layer)

The roll member according to the exemplary embodiment may include a surface layer arranged on the elastic layer.

The surface layer, for example, contains a resin, optionally a conductive agent, particles to impart roughness (specific surface roughness) to the surface of the surface layer and other additives.

Examples of the resin include acrylic resins, cellulose resins, polyamide resins, copolymerized nylons, polyurethane resins, polycarbonate resins, polyester resins, polyethylene resins, polyvinyl resins, polyarylate resins, styrene butadiene resins, melamine resins, epoxy resins, urethane resins, silicone resins, fluoro resins (for example, tetrafluoroethylene/perfluoro(alkyl vinyl ether) copolymers, tetrafluoroethylene-hexafluoropropylene copolymers, and polyvinylidene fluoride), and urea resins.

Here, the copolymerized nylon may be a copolymerized nylon that has at least one polymerization unit selected from the group consisting of nylon 610, nylon 11 and nylon 12. The copolymerized nylon may include another polymerization unit such as nylon 6 or nylon 66.

The rubber material to be blended in the elastic layer may be used as the resin.

The conductive agent blended in the surface layer is an electroconductive or ionic conductive agent. Examples of the electroconductive agent include powders of the followings: carbon black such as Ketjen black and acetylene black; thermally decomposed carbon or graphite; various conductive metals or alloys (such as aluminum, copper, nickel and stainless steel); various conductive metal oxides (such as tin oxide, indium oxide, titanium oxide, tin oxide-antimony oxide solid solutions and tin oxide-indium oxide solid solutions); and insulating substances whose surface are treated with a conductive material. In addition, examples of the ionic conductive agent include perchlorates and chlorates of tetraethylammonium or lauryl trimethyl ammonium; and perchlorates and chlorates of alkaline metals or alkaline earth metals such as lithium or magnesium. The conductive agent may be used alone or in combination of two or more kinds thereof.

Here, specific examples of commercially available products of carbon black include SPECIAL BLACK 350, SPECIAL BLACK 100, SPECIAL BLACK 250, SPECIAL BLACK 5, SPECIAL BLACK 4, SPECIAL BLACK 4A, SPECIAL BLACK 550, SPECIAL BLACK 6, COLOR BLACK FW200, COLOR BLACK FW2 and COLOR BLACK FW2V (all trade names; manufactured by Degussa), and MONARCH 1000, MONARCH 1300, MONARCH 1400, MOGUL-L and REGAL 400R (all trade names; manufactured by Cabot Corporation).

Particles to impart roughness (specific surface roughness) to the surface of the surface layer may be conductive particles or non-conductive particles. Non-conductive particles are preferred. Examples of conductive particles included are the same as examples of the conductive agent blended in the elastic layer. Examples of the non-conductive particles include resin particles (such as polyimide resin particles, methacrylic resin particles, polystyrene resin particles, fluorine resin particles, silicone resin particles), inorganic particles (such as clay particles, kaolin particles, talc particles, silica particles, alumina particles), and ceramic particles. The particles may be composed of the same resin as the resin described above. As a result, miscibility between the particles and the resin is improved and adhesion between the particles and the resin is thus enhanced.

Here, the term "conductive" means that the volume resistivity is lower than $10^{13}$ $\Omega$cm, the term "non-conductive" means that the volume resistivity is $10^{13}$ $\Omega$cm or more. In addition, others are the same as above.

Other additives added to the surface layer may be materials, which are commonly added to the surface layer, such as conductive agents, curing agents, vulcanizers, vulcanization accelerators, antioxidants, surfactants and coupling agents.

The thickness of surface layer is preferably from 7 µm to 25 µm. In addition, volume resistivity of the surface layer is preferably from $10^3$ $\Omega$cm to $10^{14}$ $\Omega$cm.

The resin, conductive agent or the like is dispersed in a solvent to prepare a coating solution and the coating solution is applied to the formed elastic layer.

Examples of the application method of the coating solution include a blade coating method, a Meyer Bar coating method, a spray coating method, an immersion coating method, a bead coating method, an air knife coating method, a curtain coating method or the like.

The solvent used for the coating solution is not particularly limited and may be a generally used solvent. Examples of the solvent include alcohols such as methanol, ethanol, propanol, butanol; ketones such as acetone and methyl ethyl ketone; tetrahydrofuran; ethers such as diethyl ether, and dioxane. In addition to these solvents, other solvents may be used. The solvent used in an immersion coating method generally used for production of electrophotographic photoreceptors may be a solvent such as alcohol or ketone or a mixture thereof.

(Use)

The roll member having this configuration is for example used for, in an electrophotographic image forming apparatus, a charging unit (charging roll), a transfer unit (transfer roll), a support roll to support a belt member from the inner circumferential surface and a transport roll to transport a recording medium or the like.

[Image Forming Apparatus, Process Cartridge]

Hereinafter, a case in which the roll member according to the exemplary embodiment is provided in a charging unit of an image forming apparatus and a process cartridge will be described.

Figure 2:
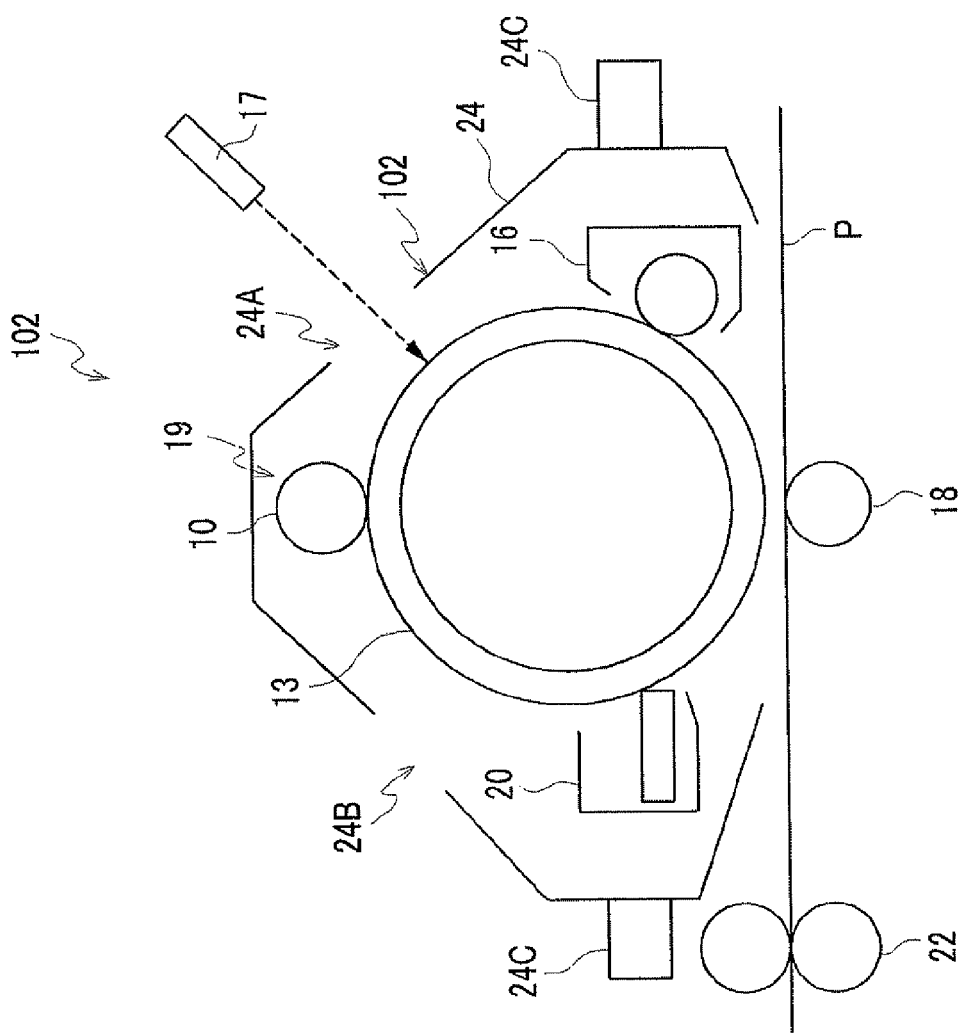
FIG. 2 is a schematic view illustrating a process cartridge according to the exemplary embodiment.

FIG. 1 is a schematic view illustrating the configuration of an image forming apparatus according to the exemplary embodiment. FIG. 2 is a schematic view illustrating the configuration of a process cartridge according to the exemplary embodiment.

The image forming apparatus 100 according to the exemplary embodiment includes an image holding member 13, a charging unit 19 that charges the image holding member 13 arranged near the image holding member 13, a latent image forming unit 17 that exposes the image holding member 13 charged by the charging unit 19 to form a latent image, a developing unit 16 that develops the electrostatic latent image formed by the latent image forming unit 17 by a toner to form a toner image, a transfer unit 18 that transfers the toner image formed by the developing unit 16 to a recording medium P, and a cleaning unit 20 that removes residual toner left on the surface of the image holding member 13 after transfer, as shown in FIG. 1. In addition, the image forming apparatus 100 further includes a fixing unit 22 that fixes the toner image transferred to the recording medium P through the transfer unit 18.

In addition, the image forming apparatus 100 according to the exemplary embodiment includes the charging unit 19 provided with a roll member 10 according to the exemplary embodiment. The roll member 10, arranged in contact with the surface of the image holding member 13, receives a power from a power feed unit (not shown) and thus electrically charges the image holding member 13.

In addition, the elements of the image forming apparatus 100 according to the exemplary embodiment, except for the roll member 10 provided in the charging unit 19 may be in accordance with elements of the electrophotographic image forming apparatus known in the art. Hereinafter, an example of each element will be described.

Although the image holding member 13 may be any known photoreceptor without particular limitation, the image holding member 13 is preferably an organic photoreceptor having a functional separation-type structure in which a charge generation layer and a charge transfer layer are separated. In addition, the image holding member 13 may be preferably a photoreceptor coated with a protective layer having a charge transporting properties and thus a cross-linking structure. In addition, the image holding member 13 is preferably a photoreceptor which contains a siloxane, phenolic, melamine, guanamine, or acrylic resin as a cross-linking component for the protective layer.

The latent image forming unit 17 is for example a laser optical system, an LED array, or the like.

The developing unit 16 may be for example a developing device in which a toner image is formed by bringing a developer support with a developer layer formed on the surface thereof into contact with or closer to the image holding member 13, and attaching a toner to a latent image on the surface of the image holding member 13. A developing method used in the developing unit 16 is preferably a known method such as a method using a two-component developer. Examples of the developing method using a two-component developer include a cascade development and a magnetic brush development.

Examples of the transfer unit 18 include a non-contact transferring device such as a corotron and a contact transferring device that transfers a toner image to the recording medium P by contacting a conductive transfer roller with the image holding member 13 through the recording medium P.

Examples of the cleaning unit 20 include a plate-type member that removes toner, paper powder or contaminants attached to the surface of the image holding member 13 by directly contacting the plate-type member with the surface of the image holding member 13. The cleaning unit 20 may be a cleaning brush or a cleaning roller, other than the plate-type member.

Preferred examples of the fixing unit 22 include a heating fixing device. For example, the heating fixing device includes a fixing roller having a heater lamp for heating in its cylindrical core and, on the outer peripheral surface thereof, having a so-called release layer such as a heat resistant resin coating layer or a heat-resistant rubber coating layer, and a pressurizing roller or a pressurizing belt that comes into contact with the fixing roller at a specific contact pressure and has a heat resistant elastic layer formed on the outer peripheral surface of the cylindrical core or the surface of a belt-like base thereof. In a fixing process of an unfixed toner image, the recording medium P to which the unfixed toner image has been transferred is passed between the fixing roller and the pressurizing roller or belt, and the toner image is fixed by thermally melting a binder resin or additives in the toner.

In addition, the configuration of the image forming apparatus 100 according to the exemplary embodiment is not limited to the above-described configuration. For example, the image forming apparatus 100 according to the present exemplary embodiment may be an intermediate transfer-type image forming device using an intermediate transfer medium or a tandem-type image forming device in which image forming units that form toner images of each color are arranged in the horizontal direction.

As shown in FIG. 2, the process cartridge according to the present exemplary embodiment is a process cartridge 102 that assembles the image holding member 13, the charging unit 19 provided with the roll member to charge the image holding member 13, the developing unit 16 to develop an electrostatic image formed by the latent image forming unit 17 using a toner and thereby form a toner image, and a cleaning unit 20 to remove the toner remaining on the surface of the image holding member 13 after transfer in FIG. 1 to integrate, together with a housing 24 having an opening 24A for exposure, an opening 24B for erasing exposure and a mounting rail 24C. The process cartridge 102 is detachable from the image forming apparatus 100 shown in FIG. 1.

In addition, the process cartridge according to the present exemplary embodiment is not particularly limited so long as it includes an image holding member 13 and the roll member according to the exemplary embodiment as a charging unit 19. For example, in another exemplary embodiment, the process cartridge may include in addition to the image holding member 13 and the charging unit 19, at least one selected from the latent image forming unit 17, the developing unit 16, the transfer unit 18, and the cleaning unit 20 and may be detachable from the image forming apparatus 100. In addition, as shown in FIG. 2, in another exemplary embodiment, the process cartridge may have a structure in which the developing unit 16 and the cleaning unit 20 are integrated.

EXAMPLES

Hereinafter, the invention is described in more detail with reference to Examples, but the invention is not limited to these examples. In addition, "part" is based on weight unless otherwise specified.

<Polyalphaolefin>

In this example, commercially available polyalphaolefin set forth in Table 1 is used. Trade names of commercially available polyalphaolefin and the composition thereof (polymerization ratio of monomers (olefin hydrocarbon) and weight average molecular weight Mw) are shown in Table 1.

TABLE 1

Polymerization ratio of polyalphaolefin

| Trade name (manufacturing company) (Mw) | Polymerization ratio (%) | | |
|---|---|---|---|
| | Propylene | Ethylene | 1-Butene |
| "RT2115" (manufactured by REXtac, LLC.) (Mw48000) | 100 | 0 | 0 |
| "RT2585" (manufactured by REXtac, LLC.) (Mw64900) | 83 | 17 | 0 |
| "RT2780" (manufactured by REXtac, LLC.) (Mw80000) | 65 | 0 | 35 |

Example A

Example A1

[Core]

The core of the roll member used herein is obtained by cutting a cylindrical rod with a diameter of 8 mm to a length of 330 mm in a drawing process and subjecting the rod to electroless nickel plating with a thickness of 8 μm.

[Composition of Elastic Layer Rubber]

Rubber material . . . 100 parts by weight (Epichlorohydrin-ethylene oxide-allyl glycidyl ether copolymer rubber, trade name "CG102", manufactured by Daiso Co., Ltd.)

Polyalphaolefin . . . 15 parts by weight (trade name "RT2585" manufactured by REXtac, LLC.)

Zinc oxide . . . 5 parts by weight (trade name "Zinc oxide 2#" manufactured by Seido Chemical Industry Co., Ltd.)

Stearic acid . . . 1 part by weight (trade name "stearic acid S" manufactured by Kao Corp.)

Carbon black . . . 5 parts by weight (trade name "Printex35", manufactured by Degussa Corp., DBP oil absorption amount: 42 ml/100 g)

Silica . . . 40 parts by weight (trade name "NipsilRS-150", manufactured by Tosoh Silica Corp.)

Ionic conductive agent . . . 1 part by weight (alkyl trimethyl ammonium perchlorate, trade name "LXN-30" manufactured by Daiso Co., Ltd.)

Vulcanizer . . . 1 part by weight (trade name "Golden flower sulfur powder 200 mesh", manufactured by Tsurumi Chemical Co., Ltd.)

Vulcanization accelerator . . . 2 parts by weight (trade name "NOCCELER DM", manufactured by Ouchi Shinko Chemical Industrial Co., Ltd.)

Vulcanization accelerator . . . 0.5 part by weight (trade name "NOCCELER TET", manufactured by Ouchi Shinko Chemical Industrial Co., Ltd.)

[Preparation of Rubber Composition]

The rubber mixture having the composition above is kneaded with a tangent-type pressurizing kneader (manufactured by Moriyama Co., Ltd.; actual capacity: 75 L) to prepare an unvulcanized rubber composition.

Specifically, a jacket, a pressurizing cover and a rotor of the pressurizing kneader are adjusted to 20° C. using circulating water, the pressure of the pressurizing cover is set to 0.6 MPa, the rubber material is subjected to mastication, zinc oxide is kneaded, stearic acid and carbon black are added thereto with kneading and the ionic conductive agent and silica are added thereto with kneading. In addition, the rubber material is cut in the form of a sheet using a 22 inch open roll, cooled, the vulcanizer and the vulcanization accelerators are added thereto, followed by kneading using the pressurizing kneader, the rubber material is cut in the form of a sheet using the 22 inch open roll again to obtain an unvulcanized rubber composition.

[Production of Roll Member]

The unvulcanized rubber composition is extruded at a screw revolution rate of 25 rpm using a monoaxial rubber extruder in which the inner diameter of a cylinder is D=60 mm and L/D=20, and at the same time a core is passed continuously through a cross head to coat the unvulcanized rubber composition on the core. As the temperature condition of the extruder, all of the cylinder, screw, head and die portions are set to 90° C.

After extrusion molding, the unvulcanized rubber composition coated in the form of a layer is cut to 15 mm from the core end and the composition is vulcanized in an oven at 160° C. for 90 minutes to form an elastic layer and thereby obtain a roll member.

[Production of Sample for Evaluating Bleeding]

Separately, a sheet-shaped sample is produced. Specifically, the unvulcanized rubber composition is added to a die with a size of 2 mm×150 mm×230 mm and the die is heated at 160° C. for 40 minutes to vulcanize the rubber composition and thereby produce the sheet sample. This sample is used as a sample for evaluating bleeding.

Example A2

An unvulcanized rubber composition is prepared and a roll member is obtained using the composition in the same manner as in Example A1 except that 1 part by weight of polyalphaolefin ("RT2585") is mixed. In addition, a sample for evaluating bleeding is obtained.

Example A3

An unvulcanized rubber composition is prepared and a roll member is obtained using the composition in the same manner as in Example A1 except that 40 parts by weight of polyalphaolefin ("RT2585") is mixed. In addition, a sample for evaluating bleeding is obtained.

Example A4

An unvulcanized rubber composition is prepared and a roll member is obtained using the composition in the same manner as in Example A2 except that polyalphaolefin ("RT2115") is used instead of polyalphaolefin ("RT2585"). In addition, a sample for evaluating bleeding is obtained.

Example A5

An unvulcanized rubber composition is prepared and a roll member is obtained using the composition in the same manner as in Example A3 except that polyalphaolefin ("RT2115") is used instead of polyalphaolefin ("RT2585"). In addition, a sample for evaluating bleeding is obtained.

Example A6

An unvulcanized rubber composition is prepared and a roll member is obtained using the composition in the same manner as in Example A2 except that polyalphaolefin (trade name "RT2780") is used instead of polyalphaolefin ("RT2585"). In addition, a sample for evaluating bleeding is obtained.

Example A7

An unvulcanized rubber composition is prepared and a roll member is obtained using the composition in the same manner as in Example A3 except that polyalphaolefin ("RT2780") is used instead of polyalphaolefin ("RT2585"). In addition, a sample for evaluating bleeding is obtained.

Example A8

An unvulcanized rubber composition is prepared and a roll member is obtained using the composition in the same manner as in Example A1 except that NBR (acrylonitrile butadiene rubber, trade name "DN3355" manufactured by Nippon Zeon Co., Ltd.) is used instead of the rubber material and 2.0 parts by weight of the ionic conductive agent (LXN-30) is used. In addition, a sample for evaluating bleeding is obtained.

Example A9

An unvulcanized rubber composition is prepared and a roll member is obtained using the composition in the same manner as in Example A1 except that EPDM (ethylene propylene terpolymer, trade name "EPT4021" manufactured by Mitsui Chemicals Co., Ltd.) is used instead of the rubber material and 2.0 parts by weight of the ionic conductive agent (LXN-30) is used. In addition, a sample for evaluating bleeding is obtained.

Comparative Example A1

An unvulcanized rubber composition is prepared and a roll member is obtained using the composition in the same manner as in Example A1 except that polyalphaolefin ("RT2585") is not mixed. In addition, a sample for evaluating bleeding is obtained.

Comparative Example A2

An unvulcanized rubber composition is prepared and a roll member is obtained using the composition in the same manner as in Example A1 except that the polyalphaolefin ("RT2585") is displaced by a softener (paraffin process oil, trade name "Diana process oil PW-90", manufactured by Idemitsu Kosan Co., Ltd.). In addition, a sample for evaluating bleeding is obtained.

Comparative Example A3

An unvulcanized rubber composition is prepared and a roll member is obtained using the composition in the same manner as in Example A1 except that the polyalphaolefin ("RT2585") is displaced by a plasticizer (adipic acid ether ester-based plasticizer, trade name "RS107", manufactured by ADEKA Corporation). In addition, a sample for evaluating bleeding is obtained.

<Evaluation>

Respective Examples are evaluated as follows. The results thus obtained are shown in Table 2.

[Measurement of Die Swelling]

A slab rubber is extruded using a rubber extruder such that the core is not passed through the extruder and a swelling ratio with respect to a die aperture is measured.

Measurement method of die swelling The slab rubber is cut to about 1 m, allowed to stand in a laboratory environment for one day, the length and weight of the slab rubber are measured and variation in a cross-sectional area is measured in accordance with the following equation.

$$DS(\%)=(W/(l\rho S_0)-1)\times 100 \qquad \text{Equation}$$

wherein DS represents die swelling, W represents the weight of a slab rubber (based on g), l represents the length of a slab rubber (based on cm), $\rho$ represents the specific gravity of the slab and $S_0$ represents a cross-sectional area of a die (based on $cm^2$).

—Evaluation Criteria—

AA: equal to or lower than 30%
A: higher than 30% and equal to or lower than 40%
B: higher than 40% and lower than 50%
C: equal to or higher than 50%

[Measurement of Terminal Protrusion Level of Elastic Layer]

An axial outer diameter of the roll member is measured using a laser outer diameter meter, and a level in which the end portion of the elastic layer (axial end portion of the roll member) is contracted and thus tilted is evaluated from a difference between the outer diameter of the axial end portion and the outer diameter of the axial central portion of the roll member.

—Evaluation Criteria—

AA: equal to or less than 500 µm
A: more than 500 µm and equal to or less than 700 µm
B: more than 700 µm and less than 900 µm
C: equal to or more than 900 µm

[Evaluation of Bleeding]

The samples for evaluating bleeding are suspended in the air in an environmental test laboratory of room temperature of 45° C. and humidity of 90% and allowed to stand for 7 days, subsequently, in an environmental test laboratory of room temperature of 23° C. and humidity of 50%, silica sand (No. 6) is scattered on the surface of the sample for evaluating bleeding and then wiped off lightly with a brush and bleeding is evaluated from an area of silica sand attached to the surface of the sample for evaluating bleeding (attachment ratio of silica sand).

—Evaluation Criteria—

AA: equal to or higher than 0% and lower than 15%
A: equal to or higher than 15% and lower than 30%
B: equal to or higher than 30% and lower than 45%
C: equal to or higher than 45%

[Measurement of Surface Roughness of Elastic Layer]

A surface roughness Rz of the roll member surface (elastic layer surface) is obtained by measuring roughness in a circumferential direction using a roughness meter (SURFCOM 1500DX-12: manufactured by Tokyo Seimitsu Co., Ltd.) and averaging the roughness.

In addition, the roughness Rz of surface is obtained by measuring the roughness in the axial direction of the roll member in accordance with JISB0601-1994 using the meter under conditions of a measured length of 4.0 mm, a cut-off value of 0.8 and a measuring rate of 0.30 mm/sec, at points positioned 5 mm from both axial ends of the roll member and three points of axially central parts which are equally divided, based on the points positioned 5 mm from both axial ends thereof and averaging the values.

—Evaluation Criteria—

AA: roughness Rz lower than 10 µm,
A: roughness Rz equal to or higher than 10 µm and lower than 15 µm,
B: roughness Rz equal to or higher than 15 µm to lower than 20 µm,
C: roughness Rz equal to or higher than 20 µm.

TABLE 2

Evaluation results of Example A

|  | Die swelling | Surface roughness Rz of elastic layer | Terminal protrusion level of elastic layer | Bleeding |
|---|---|---|---|---|
| Ex. A1 | AA | AA | AA | AA |
| Ex. A2 | A | A | AA | AA |
| Ex. A3 | AA | AA | AA | AA |
| Ex. A4 | AA | A | AA | AA |
| Ex. A5 | A | AA | AA | AA |
| Ex. A6 | AA | A | AA | AA |
| Ex. A7 | A | AA | AA | AA |
| Ex. A8 | AA | AA | AA | AA |
| Ex. A9 | AA | AA | AA | AA |
| Comp. Ex. A1 | C | C | C | AA |
| Comp. Ex. A2 | C | B | C | C |
| Comp. Ex. A3 | C | B | C | C |

It can be seen from the results above that the Examples exhibit superior die swelling, terminal protrusion level due to contraction of the rubber of the elastic layer, and bleeding, as compared to the Comparative Examples.

Example B

Example B1

[Core]

The core of the roll member herein used is obtained by cutting a cylindrical rod with a diameter of 8 mm to a length of 330 mm in a drawing process and subjecting the rod to electroless nickel plating with a thickness of 8 μm.

[Composition of Elastic Layer Rubber]

Rubber material . . . 100 parts by weight (Epichlorohydrin-ethylene oxide-allyl glycidyl ether copolymer rubber, trade name "CG102", manufactured by Daiso Co., Ltd.)

Polyalphaolefin . . . 15 parts by weight (trade name "RT2585" manufactured by REXtac, LLC.)

Zinc oxide . . . 5 parts by weight (trade name "Zinc oxide 24" manufactured by Seido Chemical Industry Co., Ltd.)

Stearic acid . . . 1 part by weight (trade name "stearic acid S" manufactured by Kao Corp.)

Carbon black . . . 5 parts by weight (trade name "Printex35", manufactured by Degussa Corp., DBP oil absorption amount: 42 ml/100 g)

Silica . . . 90 parts by weight (trade name "NipsilRS-150", manufactured by Tosoh Silica Corp.)

Ionic conductive agent . . . 1 part by weight (alkyl trimethyl ammonium perchlorate, trade name "LXN-30" manufactured by Daiso Co., Ltd.)

Vulcanizer . . . 1 part by weight (trade name "Golden flower sulfur powder 200 mesh", manufactured by Tsurumi Chemical Co., Ltd.)

Vulcanization accelerator . . . 2 parts by weight (trade name "NOCCELER DM", manufactured by Ouchi Shinko Chemical Industrial Co., Ltd.)

Vulcanization accelerator . . . 0.5 part by weight (trade name "NOCCELER TET" manufactured by Ouchi Shinko Chemical Industrial Co., Ltd.)

[Preparation of Rubber Composition]

The rubber mixture having the composition above is kneaded with a tangent-type pressurizing kneader (manufactured by Moriyama Co., Ltd.; actual capacity: 75 L) to prepare an unvulcanized rubber composition.

Specifically, a jacket, a pressurizing cover and a rotor of the pressurizing kneader are adjusted to 20° C. using circulating water, the pressure of the pressurizing cover is set to 0.6 MPa, the rubber material is subjected to mastication, zinc oxide is kneaded, stearic acid and carbon black are added thereto with kneading and the ionic conductive agent and silica are added thereto with kneading. In addition, the rubber material is cut in the form of a sheet using a 22 inch open roll, cooled, the vulcanizer and the vulcanization accelerators are added thereto, followed by kneading using the pressurizing kneader, the rubber material is cut in the form of a sheet using the 22 inch open roll again to obtain an unvulcanized rubber composition.

[Production of Roll Member]

The unvulcanized rubber composition is extruded at a screw revolution rate of 25 rpm using a monoaxial rubber extruder in which the inner diameter of a cylinder is D=60 mm and L/D=20, and at the same time a core is passed continuously through a cross head to coat the unvulcanized rubber composition on the core. As the temperature condition of the extruder, all of the cylinder, screw, head and die portions are set to 90° C.

After extrusion molding, the unvulcanized rubber composition coated in the form of a layer is cut to 15 mm from the core end and the composition is vulcanized in an oven at 160° C. for 90 minutes to form an elastic layer and thereby obtain a roll member.

[Production of Sample for Evaluating Bleeding and Electrical Field Dependence of the Electrical Resistance]

Separately, a sheet-shaped sample is produced. Specifically, the kneaded rubber composition having the composition above is added to a die with a size of 2 mm×150 mm×230 mm and the die is heated at 160° C. for 40 minutes to vulcanize the rubber composition and thereby produce the sheet sample. This sample is used as a sample for evaluating bleeding and electrical field dependence of the electrical resistance.

Example B2

An unvulcanized rubber composition is prepared and a roll member is obtained using the composition in the same manner as in Example B1 except that 1 part by weight of polyalphaolefin ("RT2585") is mixed. In addition, a sample for evaluating bleeding and electrical field dependence of the electrical resistance is obtained.

Example B3

An unvulcanized rubber composition is prepared and a roll member is obtained using the composition in the same manner as in Example B1 except that 40 parts by weight of polyalphaolefin ("RT2585") is mixed. In addition, a sample for evaluating bleeding and electrical field dependence of the electrical resistance is obtained.

Example B4

An unvulcanized rubber composition is prepared and a roll member is obtained using the composition in the same manner as in Example B2 except that polyalphaolefin ("RT2115") is used instead of polyalphaolefin ("RT2585"). In addition, a sample for evaluating bleeding and electrical field dependence of the electrical resistance is obtained.

Example B5

An unvulcanized rubber composition is prepared and a roll member is obtained using the composition in the same manner as in Example B3 except that polyalphaolefin ("RT2115")

is used instead of polyalphaolefin ("RT2585"). In addition, a sample for evaluating bleeding and electrical field dependence of the electrical resistance is obtained.

Example B6

An unvulcanized rubber composition is prepared and a roll member is obtained using the composition in the same manner as in Example B2 except that polyalphaolefin ("RT2780") is used instead of polyalphaolefin ("RT2585"). In addition, a sample for evaluating bleeding and electrical field dependence of the electrical resistance is obtained.

Example B7

An unvulcanized rubber composition is prepared and a roll member is obtained using the composition in the same manner as in Example B3 except that polyalphaolefin ("RT2780") is used instead of polyalphaolefin ("RT2585"). In addition, a sample for evaluating bleeding and electrical field dependence of the electrical resistance is obtained.

Example B8

An unvulcanized rubber composition is prepared and a roll member is obtained using the composition in the same manner as in Example B1 except that NBR (acrylonitrile butadiene rubber, trade name "DN3355" manufactured by Nippon Zeon Co., Ltd.) is used instead of the rubber material and 2.0 parts by weight of the ionic conductive agent (LXN-30) is used. In addition, a sample for evaluating bleeding and electrical field dependence of the electrical resistance is obtained.

Example B9

An unvulcanized rubber composition is prepared and a roll member is obtained using the composition in the same manner as in Example B1 except that EPDM (ethylene propylene terpolymer, trade name "EPT4021" manufactured by Mitsui Chemicals Co., Ltd.) is used instead of the rubber material and 2.0 parts by weight of the ionic conductive agent (LXN-30) is used. In addition, a sample for evaluating bleeding and electrical field dependence of the electrical resistance is obtained.

Example B10

An unvulcanized rubber composition is prepared and a roll member is obtained using the composition in the same manner as in Example B1 except that the DBP oil absorption amount of carbon black is changed to 175 ml/100 g (trade name "#3050 B", manufactured by Mitsubishi Chemical Co., Ltd.). In addition, a sample for evaluating bleeding and electrical field dependence of the electrical resistance is obtained.

Example B11

An unvulcanized rubber composition is prepared and a roll member is obtained using the composition in the same manner as in Example B1 except that the DBP oil absorption amount of carbon black is changed to 130 ml/100 g (trade name "43050 B", manufactured by Mitsubishi Chemical Co., Ltd.). In addition, a sample for evaluating bleeding and electrical field dependence of the electrical resistance is obtained.

Example B12

An unvulcanized rubber composition is prepared and a roll member is obtained using the composition in the same manner as in Example B1 except that the DBP oil absorption amount of carbon black is changed to 87 ml/100 g (trade name "Asahi 455", manufactured by Asahi Carbon Co., Ltd.). In addition, a sample for evaluating bleeding and electrical field dependence of the electrical resistance is obtained.

Example B13

An unvulcanized rubber composition is prepared and a roll member is obtained using the composition in the same manner as in Example B1 except that the DBP oil absorption amount of carbon black is changed to 45 ml/100 g (trade name "Asahi #35", manufactured by Asahi Carbon Co., Ltd.). In addition, a sample for evaluating bleeding and electrical field dependence of the electrical resistance is obtained.

Example B14

An unvulcanized rubber composition is prepared and a roll member is obtained using the composition in the same manner as in Example B12 except that the amount of carbon black added is changed to 50 parts by weight. In addition, a sample for evaluating bleeding and electrical field dependence of the electrical resistance is obtained.

Example B15

An unvulcanized rubber composition is prepared and a roll member is obtained using the composition in the same manner as in Example B12 except that the amount of carbon black added is changed to 40 parts by weight. In addition, a sample for evaluating bleeding and electrical field dependence of the electrical resistance is obtained.

Example B16

An unvulcanized rubber composition is prepared and a roll member is obtained using the composition in the same manner as in Example B12 except that the amount of carbon black added is changed to 30 parts by weight. In addition, a sample for evaluating bleeding and electrical field dependence of the electrical resistance is obtained.

Example B17

An unvulcanized rubber composition is prepared and a roll member is obtained using the composition in the same manner as in Example B12 except that the amount of carbon black added is changed to 15 parts by weight. In addition, a sample for evaluating bleeding and electrical field dependence of the electrical resistance is obtained.

Example B18

An unvulcanized rubber composition is prepared and a roll member is obtained using the composition in the same manner as in Example B12 except that the amount of carbon black added is changed to 10 parts by weight. In addition, a sample for evaluating bleeding and electrical field dependence of the electrical resistance is obtained.

Example B19

An unvulcanized rubber composition is prepared and a roll member is obtained using the composition in the same manner as in Example B1 except that, as two types of carbon black, the carbon black having a DBP oil absorption amount of 130 ml/100 g used in Example B11, and the carbon black having a DBP oil absorption amount of 87 ml/100 g used in Example B12 are used in amounts of 15 parts by weight and 10 parts by weight, respectively. In addition, a sample for evaluating bleeding and electrical field dependence of the electrical resistance is obtained.

Example B20

An unvulcanized rubber composition is prepared and a roll member is obtained using the composition in the same manner as in Example B1 except that, as three types of carbon black, the carbon black having a DBP oil absorption amount of 130 ml/100 g used in Example B11, the carbon black having a DBP oil absorption amount of 87 ml/100 g used in Example B12 and the carbon black having a DBP oil absorption amount of 45 ml/100 g used in Example B13 are used in amounts of 10 parts by weight, 10 parts by weight and 10 parts by weight, respectively. In addition, a sample for evaluating bleeding and electrical field dependence of the electrical resistance is obtained.

Comparative Example B1

An unvulcanized rubber composition is prepared and a roll member is obtained using the composition in the same manner as in Example B1 except that polyalphaolefin ("RT2585") is not mixed. In addition, a sample for evaluating bleeding and electrical field dependence of the electrical resistance is obtained.

Comparative Example B2

An unvulcanized rubber composition is prepared and a roll member is obtained using the composition in the same manner as in Example B1 except that the polyalphaolefin ("RT2585") is displaced by a softener (paraffin process oil, trade name "Diana process oil PW-90", manufactured by Idemitsu Kosan Co., Ltd.). In addition, a sample for evaluating bleeding and electrical field dependence of the electrical resistance is obtained.

Comparative Example B3

An unvulcanized rubber composition is prepared and a roll member is obtained using the composition in the same manner as in Example B1 except that the polyalphaolefin ("RT2585") is displaced by a plasticizer (adipic acid ether ester-based plasticizer, trade name "RS107", manufactured by ADEKA Corporation). In addition, a sample for evaluating bleeding and electrical field dependence of the electrical resistance is obtained.

Example B21

An unvulcanized rubber composition is prepared and a roll member is obtained using the composition in the same manner as in Example B14 except that the DBP oil absorption amount of carbon black is changed to 180 ml/100 g (trade name "Asahi #15", manufactured by Asahi Carbon Co., Ltd.). In addition, a sample for evaluating bleeding and electrical field dependence of the electrical resistance is obtained.

Example B22

An unvulcanized rubber composition is prepared and a roll member is obtained using the composition in the same manner as in Example B1 except that the DBP oil absorption amount of carbon black is changed to 41 ml/100 g (trade name "Asahi F-200", manufactured by Asahi Carbon Co., Ltd.). In addition, a sample for evaluating bleeding and electrical field dependence of the electrical resistance is obtained.

Example B23

An unvulcanized rubber composition is prepared and a roll member is obtained using the composition in the same manner as in Example B12 except that the carbon black added is changed in an amount of 55 parts by weight. In addition, a sample for evaluating bleeding and electrical field dependence of the electrical resistance is obtained.

<Evaluation>

Respective Examples are evaluated as follows. The results thus obtained are shown in Table 3.

[Measurement of Die Swelling]

A slab rubber is extruded using a rubber extruder such that the core is not passed through the extruder and a swelling ratio with respect to a die aperture is measured.

Measurement method of die swelling The slab rubber is cut to about 1 m, allowed to stand in a laboratory environment for one day, the length and weight of the slab rubber are measured and variation in a cross-sectional area is measured in accordance with the following equation.

$$DS(\%) = (W/(l\rho S_0) - 1) \times 100 \quad \text{Equation}$$

wherein DS represents die swelling, W represents the weight of the slab rubber (based on g), l represents the length of a slab rubber (based on cm), $\rho$ represents the specific gravity of the slab, and $S_0$ represents a cross-sectional area of a die (based on $cm^2$).

—Evaluation Criteria—

AA: equal to or lower than 20%
A: higher than 20% and equal to or lower than 30%
B: higher than 30% and equal to or lower than 40%
C: higher than 40% and lower than 50%
CC: equal to or higher than 50%

[Measurement of Terminal Protrusion Level of Elastic Layer]

An axial outer diameter of the roll member is measured using a laser outer diameter meter, and a level in which the end portion of the elastic layer (axial end portion of the roll member) is contracted and thus tilted is evaluated from a difference between the axial outer diameter of the axial end portion and the outer diameter of the axial central portion of the roll member.

—Evaluation Criteria—

AA: equal to or less than 200 μm
A: more than 200 μm and equal to or less than 300 μm
B: more than 300 μm and equal to or less than 500 μm
C: more than 500 μm

[Evaluation of Bleeding]

The samples for evaluating bleeding are suspended in the air in an environmental test laboratory of room temperature of 45° C. and humidity of 90% and allowed to stand for 7 days, subsequently, in an environmental test laboratory of room temperature of 23° C. and humidity of 50%, silica sand (No. 6) is scattered on the surface of the sample for evaluating bleeding and then wiped off lightly with a brush and bleeding is evaluated from an area of silica sand attached to the surface of the sample for evaluating bleeding (attachment ratio of silica sand).

—Evaluation Criteria—
AA: equal to or higher than 0% and lower than 15%
A: equal to or higher than 15% and lower than 30%
B: equal to or higher than 30% and lower than 45%
C: equal to or higher than 45%

[Measurement of Surface Roughness of Elastic Layer]

A surface roughness Rz of the roll member surface (elastic layer surface) is obtained by measuring roughness in a circumferential direction using a roughness meter (SURFCOM 1500DX-12: manufactured by Tokyo Seimitsu Co., Ltd.) and averaging the roughness.

In addition, the roughness Rz of surface is obtained by measuring the roughness in the axial direction of the roll member in accordance with JISB0601-1994 using the meter under conditions of a measured length of 4.0 mm, a cut-off value of 0.8 and a measurement rate of 0.30 mm/sec, at points positioned mm from both axial ends of the roll member and three points of axially central parts which are equally divided, based on the points positioned 5 mm from both axial ends thereof and averaging the values.

—Evaluation Criteria—
AA: roughness Rz lower than 10 μm,
A: roughness Rz equal to or higher than 10 μm and lower than 15 μm,
B: roughness Rz equal to or higher than 15 μm to lower than 20 μm,
C: roughness Rz higher than 20 μm.

[Measurement of Electrical Field Dependence of the Electrical Resistance]

The sample for electrical field dependence of the electrical resistance is seasoned under conditions of 22° C. and 55% for 24 hours or longer and measurement is performed in accordance with JIS K6911 using an R8340A digital ultra-high resistance/micro current meter (manufactured by ADC Co., Ltd.), UR probe MCP-HTP12 having a double-ring electrode structure in which the connection part thereof is modified for R8340A and resistable UFL MCP-ST03 (all, manufactured by Dia Instruments Co., Ltd.).

R10 at an applied voltage of 10 V and R500 at an applied voltage of 500 V are measured for a charge time of 2 secs and a discharge time of 1 sec, R10-R500 is calculated in terms of common logarithm and electrical field dependence of the electrical resistance is then evaluated based on the following criteria.

AA: R10-R500 in terms of common logarithm equal to lower than 0.3 log Ωcm
A: R10-R500 in terms of common logarithm higher than 0.3 log Ωcm and equal to lower than 0.4 log Ωcm
B: R10-R500 in terms of common logarithm higher than 0.4 log Ωcm and equal to lower than 0.5 log Ωcm
C: R10-R500 in terms of common logarithm higher than 0.5 log Ωcm

TABLE 3

| | Die swelling | Surface roughness Rz of elastic layer | Terminal protrusion level of elastic layer | Bleeding | Electrical field dependence of the electrical resistance |
|---|---|---|---|---|---|
| Ex. B1 | A | AA | B | AA | AA |
| Ex. B2 | B | A | B | AA | AA |
| Ex. B3 | A | AA | A | AA | AA |
| Ex. B4 | A | A | B | AA | AA |
| Ex. B5 | B | AA | A | AA | AA |
| Ex. B6 | A | A | B | AA | AA |
| Ex. B7 | B | AA | B | AA | AA |
| Ex. B8 | A | AA | B | AA | AA |
| Ex. B9 | A | AA | B | AA | AA |
| Ex. B10 | A | AA | A | AA | A |
| Ex. B11 | A | AA | A | AA | AA |
| Ex. B12 | A | AA | A | AA | AA |
| Ex. B13 | B | AA | B | AA | AA |
| Ex. B14 | AA | B | AA | AA | B |
| Ex. B15 | AA | A | AA | AA | A |
| Ex. B16 | AA | AA | AA | AA | AA |
| Ex. B17 | AA | AA | AA | AA | AA |
| Ex. B18 | A | AA | A | AA | AA |
| Ex. B19 | AA | AA | AA | AA | AA |
| Ex. B20 | AA | AA | AA | AA | AA |
| Comp. Ex. B1 | CC | C | C | AA | AA |
| Comp. Ex. B2 | CC | B | C | C | AA |
| Comp. Ex. B3 | CC | B | C | C | AA |
| Ex. B21 | A | AA | A | AA | C |
| Ex. B21 | B | AA | B | AA | AA |
| Ex. B22 | AA | B | AA | AA | C |

It can be seen from the results above that the Examples exhibit superior die swelling, terminal protrusion level due to contraction of the rubber of the elastic layer, and bleeding, as compared to the Comparative Examples.

In addition, among the Examples, Examples B1 to B20 exhibit superior electrical field dependence of the electrical resistance, as compared to the other Examples.

Example C

Example C1

[Core]

The core of the roll member herein used is obtained by cutting a cylindrical rod with a diameter of 8 mm to a length of 330 mm in a drawing process and subjecting the rod to electroless nickel plating with a thickness of 8 μm.

[Composition of Elastic Layer Rubber]

Rubber material . . . 100 parts by weight (Epichlorohydrin-ethylene oxide-allyl glycidyl ether copolymer rubber, trade name "CG102", manufactured by Daiso Co., Ltd.)

Polyalphaolefin . . . 15 parts by weight (trade name "RT2585" manufactured by REXtac, LLC.)

Zinc oxide . . . 5 parts by weight (trade name "Zinc oxide 2#" manufactured by Seido Chemical Industry Co., Ltd.)

Stearic acid . . . 1 part by weight (trade name "stearic acid S" manufactured by Kao Corp.)

Carbon black . . . 5 parts by weight (trade name "Printex35", manufactured by Degussa Corp., DBP oil absorption amount: 42 ml/100 g)

Silica . . . 40 parts by weight (trade name "NipsilRS-150", manufactured by Tosoh Silica Corp.)

Magnesium oxide . . . 3 parts by weight (trade name "Kyowamag 150", manufactured by Kyowa Chemical Industry Co., Ltd.)

Hydrotalcite . . . 5 parts by weight (trade name "DHT-4A", manufactured by Kyowa Chemical Industry Co., Ltd.)

Ionic conductive agent . . . 1 part by weight (alkyl trimethyl ammonium perchlorate, trade name "LXN-30" manufactured by Daiso Co., Ltd.)

Vulcanizer (quinoxaline compound). 1.5 parts by weight (6-methylquinoxaline 2,3-dithiocarbonate: trade name "Daisonet XL-21S" manufactured by Daiso Co., Ltd.)

Vulcanization accelerator . . . 1 part by weight (phenol DBU salt: trade name "P-152", manufactured by Daiso Co., Ltd.)

[Preparation of Rubber Composition]

The rubber mixture having the composition above is kneaded with a tangent-type pressurizing kneader (manufactured by Moriyama Co., Ltd.; actual capacity: 75 L) to prepare an unvulcanized rubber composition.

Specifically, a jacket, a pressurizing cover and a rotor of the pressurizing kneader are adjusted to 20° C. using circulating water, the pressure of the pressurizing cover is set to 0.6 MPa, the rubber material is subjected to mastication, zinc oxide is kneaded, stearic acid and carbon black are added thereto with kneading and the ionic conductive agent and silica are added thereto with kneading. In addition, the rubber material is cut in the form of a sheet using a 22 inch open roll, cooled, the vulcanizer and the vulcanization accelerator are added thereto, followed by kneading using the pressurizing kneader, the rubber material is cut in the form of a sheet using the 22 inch open roll again to obtain an unvulcanized rubber composition.

[Production of Roll Member]

The unvulcanized rubber composition is extruded at a screw revolution rate of 25 rpm using a monoaxial rubber extruder in which the inner diameter of a cylinder is D=60 mm and L/D=20, and at the same time a core is passed continuously through a cross head to coat the unvulcanized rubber composition on the core. As the temperature condition of the extruder, all of the cylinder, screw, head and die portions are set to 90° C.

After extrusion molding, the unvulcanized rubber composition coated in the form of a layer is cut to 15 mm from the core end and the composition is vulcanized in an oven at 160° C. for 90 minutes to form an elastic layer and thereby obtain a roll member.

[Production of Sample for Evaluating Bleeding]

Separately, a sheet-shaped sample is produced. Specifically, the unvulcanized rubber composition is added to a die with a size of 2 mm×150 mm×230 mm and the die is heated at 160° C. for 40 minutes to vulcanize the rubber composition and thereby produce the sheet sample.

[Production of Set Bead for Evaluating Compression Permanence Distortion]

The unvulcanized rubber composition is added to a die of a large specimen in accordance with JIS K-6262 (diameter 29 mm, thickness 12.5 mm) and vulcanized with a hot press heated at 160° C. for 20 minutes to produce a cylindrical sample. The sample is used as a set bead for evaluating compression permanence distortion.

Example C2

An unvulcanized rubber composition is prepared in the same manner as Example C1 except that a triazine compound (2,4,6-trimercapto-1,5,7-triazine (trade name "OF-100") manufactured by Daiso Co., Ltd.) is used instead of the quinoxaline compound. In addition, a sample for evaluating bleeding and a set bead for evaluating compression permanence distortion is obtained.

Example C3

An unvulcanized rubber composition is prepared and a roll member is obtained using the composition in the same manner as in Example C1 except that 1 part by weight of polyalphaolefin ("RT2585") is mixed. In addition, a sample for evaluating bleeding and a set bead for evaluating compression permanence distortion is obtained.

Example C4

An unvulcanized rubber composition is prepared and a roll member is obtained using the composition in the same manner as in Example C1 except that 40 parts by weight of polyalphaolefin ("RT2585") is mixed. In addition, a sample for evaluating bleeding and a set bead for evaluating compression permanence distortion is obtained.

Example C5

An unvulcanized rubber composition is prepared and a roll member is obtained using the composition in the same manner as in Example C3 except that polyalphaolefin ("RT2115") is used instead of polyalphaolefin ("RT2585"). In addition, a sample for evaluating bleeding and a set bead for evaluating compression permanence distortion is obtained.

Example C5

An unvulcanized rubber composition is prepared and a roll member is obtained using the composition in the same manner as in Example C4 except that polyalphaolefin ("RT2115") is used instead of polyalphaolefin ("RT2585"). In addition, a sample for evaluating bleeding and a set bead for evaluating compression permanence distortion is obtained.

Example C7

An unvulcanized rubber composition is prepared and a roll member is obtained using the composition in the same manner as in Example C3 except that polyalphaolefin ("RT2780") is used instead of polyalphaolefin ("RT2585"). In addition, a sample for evaluating bleeding and a set bead for evaluating compression permanence distortion is obtained.

Example C8

An unvulcanized rubber composition is prepared and a roll member is obtained using the composition in the same manner as in Example C4 except that polyalphaolefin ("RT2780") is used instead of polyalphaolefin ("RT2585"). In addition, a sample for evaluating bleeding and a set bead for evaluating compression permanence distortion is obtained.

Example C9

An unvulcanized rubber composition is prepared and a roll member is obtained using the composition in the same manner as in Example C3 except that NBR (acrylonitrile butadiene rubber, trade name "DN3355" manufactured by Nippon Zeon Co., Ltd.) is used instead of the rubber material and 2.0 parts by weight of the ionic conductive agent (LXN-30) is used and magnesium oxide and hydrotalcite are not used. In addition, a sample for evaluating bleeding and a set bead for evaluating compression permanence distortion is obtained.

Example C10

An unvulcanized rubber composition is prepared and a roll member is obtained using the composition in the same manner as in Example C3 except that EPDM (ethylene propylene terpolymer, trade name "EPT4021" manufactured by Mitsui Chemicals Co., Ltd.) is used instead of the rubber material and 2.0 parts by weight of the ionic conductive agent (LXN-30) is used and magnesium oxide and hydrotalcite are not used. In addition, a sample for evaluating bleeding and a set bead for evaluating compression permanence distortion is obtained.

Example C11

An unvulcanized rubber composition is prepared and a roll member is obtained using the composition in the same manner as in Example C1 except that 1 part by weight of a vulcanizer (trade name "Golden flower sulfur powder 200 mesh", manufactured by Tsurumi Chemical Co., Ltd.) is used instead of the quinoxaline compound and 2 parts by weight of "NOCCELER DM" (trade name, manufactured by Ouchi Shinko Chemical Industrial Co., Ltd.) and 0.5 part by weight of "NOCCELER TET" (trade name, manufactured by Ouchi Shinko Chemical Industrial Co., Ltd.) are used as vulcanization accelerators. In addition, a sample for evaluating bleeding and a set bead for evaluating compression permanence distortion is obtained.

Comparative Example C1

An unvulcanized rubber composition is prepared and a roll member is obtained using the composition in the same manner as in Example C1 except that polyalphaolefin ("RT2585") is not mixed. In addition, a sample for evaluating bleeding and a set bead for evaluating compression permanence distortion is obtained.

Comparative Example C2

An unvulcanized rubber composition is prepared and a roll member is obtained using the composition in the same manner as in Example C1 except that the polyalphaolefin ("RT2585") is displaced by a softener (paraffin process oil, trade name "Diana process oil PW-90", manufactured by Idemitsu Kosan Co., Ltd.). In addition, a sample for evaluating bleeding and a set bead for evaluating compression permanence distortion is obtained.

Comparative Example C3

An unvulcanized rubber composition is prepared and a roll member is obtained using the composition in the same manner as in Example C1 except that the polyalphaolefin ("RT2585") is displaced by a plasticizer (adipic acid ether ester-based plasticizer, trade name "RS107", manufactured by ADEKA Corporation). In addition, a sample for evaluating bleeding and a set bead for evaluating compression permanence distortion is obtained.

<Evaluation>

Respective Examples are evaluated as follows. The results thus obtained are shown in Table 4.

[Measurement of Die Swelling]

A slab rubber is extruded using a rubber extruder such that the core is not passed through the extruder and a swelling ratio with respect to a die aperture is measured.

Measurement method of die swelling

The slab rubber is cut to about 1 m, allowed to stand in a laboratory environment for one day, the length and weight of the slab rubber are measured and variation in a cross-sectional area is measured in accordance with the following equation.

$$DS(\%) = (W/(l\rho S_0) - 1) \times 100 \quad \text{Equation}$$

wherein DS represents die swelling, W represents the weight of the slab rubber (based on g), l represents the length of a slab rubber (based on cm), $\rho$ represents the specific gravity of the slab and $S_0$ represents a cross-sectional area of a die (based on $cm^2$).

—Evaluation Criteria—
AA: equal to or lower than 30%
A: higher than 30% and equal to or lower than 40%
B: higher than 40% and lower than 50%
C: equal to or higher than 50%

[Measurement of Terminal Protrusion Level of Elastic Layer]

An axial outer diameter of the roll member is measured using a laser outer diameter meter, and a level in which the end portion of the elastic layer (axial end portion of the roll member) is contracted and thus tilted is evaluated from a difference between the outer diameter of the axial end portion and the outer diameter of the axial central portion of the roll member.

—Evaluation Criteria—
AA: equal to or less than 500 μm
A: more than 500 μm and equal to or less than 700 μm
B: more than 700 μm and less than 900 μm
C: equal to or more than 900 μm

[Evaluation of Bleeding]

The samples for evaluating bleeding are suspended in the air in an environmental test laboratory of room temperature of 45° C. and humidity of 90% and allowed to stand for 7 days, subsequently, in an environmental test laboratory of room temperature of 23° C. and humidity of 50%, silica sand (No. 6) is scattered on the surface of the sample for evaluating bleeding and then wiped off lightly with a brush and bleeding is evaluated from an area of silica sand attached to the surface of the sample for evaluating bleeding (attachment ratio of silica sand).

—Evaluation Criteria—
AA: equal to or higher than 0% and lower than 15%
A: equal to or higher than 15% and lower than 30%
B: equal to or higher than 30% and lower than 45%
C: equal to or higher than 45%

[Measurement of Surface Roughness of Elastic Layer]

A surface roughness Rz of the roll member surface (elastic layer surface) is obtained by measuring roughness in a circumferential direction using a roughness meter (SURFCOM 1500DX-12: manufactured by Tokyo Seimitsu Co., Ltd.) and averaging the roughness.

In addition, the roughness Rz of surface is obtained by measuring the roughness in the axial direction of the roll member in accordance with JISB0601-1994 using the meter under conditions of a measured length of 4.0 mm, a cut-off value of 0.8 and a measurement rate of 0.30 mm/sec, at points positioned 5 mm from both axial ends of the roll member and three points of axially central parts which are equally divided, based on the points positioned 5 mm from both axial ends thereof and averaging the values.

—Evaluation Criteria—
AA: roughness Rz lower than 10 μm,
A: roughness Rz equal to or higher than 10 μm and lower than 15 μm,
B: roughness Rz equal to or higher than 15 μm to lower than 20 μm,
C: roughness Rz equal to or higher than 20 μm.

[Compression Permanence Distortion]

Set beads for evaluating compression permanence distortion are inserted between two compression plates, are subjected to 25% compression, are allowed to stand in a thermostatic bath at 100° C. for 24 hours and compression permanence distortion (%) thereof is measured. The measured value is used for evaluating compression permanence distortion.

Compression permanence distortion percentage(%)=
$(t_0-t_2)/(t_0-t_1)*100$ $t_0$: original thickness of specimen (set beads for evaluating compression permanence distortion) (mm)
$t_1$: thickness of spacer (mm)
$t_2$: thickness of specimen (set beads for evaluating compression permanence distortion) 30 minutes after its removal from the compression device (mm)
—Evaluation Criteria—
AA: equal to or higher than 0% and lower than 20%
A: equal to or higher than 20% and lower than 50%
B: equal to or higher than 50% and lower than 80%
C: equal to or higher than 80%

TABLE 4

Evaluation results of Example C

| | Die swelling | Surface roughness Rz of elastic layer | Terminal protrusion level of elastic layer | Bleeding | Compression permanence distortion |
|---|---|---|---|---|---|
| Ex. C1 | AA | AA | AA | AA | AA |
| Ex. C2 | AA | AA | AA | AA | AA |
| Ex. C3 | AA | AA | AA | AA | AA |
| Ex. C4 | A | A | AA | AA | AA |
| Ex. C5 | AA | AA | AA | AA | AA |
| Ex. C6 | A | A | AA | AA | AA |
| Ex. C7 | AA | AA | AA | AA | AA |
| Ex. C8 | A | A | AA | AA | AA |
| Ex. C9 | AA | AA | AA | AA | AA |
| Ex. C10 | AA | AA | AA | AA | AA |
| Ex. C11 | AA | AA | AA | AA | AA |
| Comp. Ex. C1 | C | C | C | AA | B |
| Comp. Ex. C2 | C | B | C | C | B |
| Comp. Ex. C3 | C | B | C | C | B |

It can be seen from the results above that the Examples exhibit superior die swelling, terminal protrusion level due to contraction of the rubber of the elastic layer, and bleeding, as compared to the Comparative Examples.

In addition, among the Examples, Examples C1 to C11 exhibit superior compression permanence distortion, as compared to the other Examples.

Example D

Example D1

[Core]

The core of the roll member herein used is obtained by cutting a cylindrical rod with a diameter of 8 mm to a length of 330 mm in a drawing process and subjecting the rod to electroless nickel plating with a thickness of 8 μm.

[Composition of Elastic Layer Rubber]
Rubber material . . . 100 parts by weight (Epichlorohydrin-ethylene oxide-allyl glycidyl ether copolymer rubber, trade name "CG102", manufactured by Daiso Co., Ltd.)
Polyalphaolefin . . . 15 parts by weight (trade name "RT2585" manufactured by REXtac, LLC.)
Zinc oxide . . . 5 parts by weight (trade name "Zinc oxide 2#" manufactured by Seido Chemical Industry Co., Ltd.)
Stearic acid . . . 1 part by weight (trade name "stearic acid S" manufactured by Kao Corp.)
Carbon black . . . 5 parts by weight (trade name "Printex35", manufactured by Degussa Corp., DBP oil absorption amount: 42 ml/100 g)
Silica . . . 40 parts by weight (trade name "NipsilRS-150", manufactured by Tosoh Silica Corp.)
Ionic conductive agent . . . 1 part by weight (alkyl trimethyl ammonium perchlorate, trade name "LXN-30" manufactured by Daiso Co., Ltd.)
Vulcanizer . . . 1 part by weight (trade name "Golden flower sulfur powder 200 mesh", manufactured by Tsurumi Chemical Co., Ltd.)
Vulcanization accelerator . . . 2 parts by weight (trade name "NOCCELER DM", manufactured by Ouchi Shinko Chemical Industrial Co., Ltd.)
Vulcanization accelerator . . . 0.5 part by weight (trade name "NOCCELER TET", manufactured by Ouchi Shinko Chemical Industrial Co., Ltd.)

[Preparation of Rubber Composition]

The rubber mixture having the composition above is kneaded with a tangent-type pressurizing kneader (manufactured by Moriyama Co., Ltd.; actual capacity: 75 L) to prepare an unvulcanized rubber composition.

Specifically, a jacket, a pressurizing cover and a rotor of the pressurizing kneader are adjusted to 20° C. using a circulating water, the pressure of the pressurizing cover is set to 0.6 MPa, the rubber material is subjected to mastication, zinc oxide is kneaded, stearic acid and carbon black are added thereto with kneading and the ionic conductive agent and silica are added thereto with kneading. In addition, the rubber material is cut in the form of a sheet using a 22 inch open roll, cooled, the vulcanizer and the vulcanization accelerators are added thereto, followed by kneading using the pressurizing kneader, the rubber material is cut in the form of a sheet using the 22 inch open roll again to obtain an unvulcanized rubber composition.

[Production of Roll Member]

The unvulcanized rubber composition is extruded at a screw revolution rate of 25 rpm using a monoaxial rubber extruder in which the inner diameter of a cylinder is D=60 mm and L/D=20, and at the same time a core is passed continuously through a cross head to coat the unvulcanized rubber composition on the core. As the temperature condition of the extruder, all of the cylinder, screw, head and die portions are set to 90° C.

After extrusion molding, the unvulcanized rubber composition coated in the form of a layer is cut to 15 mm from the core end and the composition is vulcanized in an oven at 160° C. for 90 minutes to form an elastic layer and thereby obtain a roll member.

[Production of Sample for Evaluating Bleeding and Electrical Field Dependence of the Electrical Resistance]

Separately, a sheet-shaped sample is produced. Specifically, the kneaded rubber composition having the composition above is added to a die with a size of 2 mm×150 mm×230 mm and the die is heated at 160° C. for 40 minutes to vulcanize the rubber composition and thereby produce the sheet sample. This sample is used as a sample for evaluating bleeding and electrical field dependence of the electrical resistance.

Example D2

An unvulcanized rubber composition is prepared and a roll member is obtained using the composition in the same manner as in Example D1 except that 1 part by weight of polyalphaolefin ("RT2585") is mixed. In addition, a sample for evaluating bleeding and electrical field dependence of the electrical resistance is obtained.

Example D3

An unvulcanized rubber composition is prepared and a roll member is obtained using the composition in the same manner as in Example D1 except that 40 parts by weight of polyalphaolefin ("RT2585") is mixed. In addition, a sample for evaluating bleeding and electrical field dependence of the electrical resistance is obtained.

Example D4

An unvulcanized rubber composition is prepared and a roll member is obtained using the composition in the same manner as in Example D2 except that polyalphaolefin ("RT2115") is used instead of polyalphaolefin ("RT2585"). In addition, a sample for evaluating bleeding and electrical field dependence of the electrical resistance is obtained.

Example D5

An unvulcanized rubber composition is prepared and a roll member is obtained using the composition in the same manner as in Example D3 except that polyalphaolefin ("RT2115") is used instead of polyalphaolefin ("RT2585"). In addition, a sample for evaluating bleeding and electrical field dependence of the electrical resistance is obtained.

Example D6

An unvulcanized rubber composition is prepared and a roll member is obtained using the composition in the same manner as in Example D2 except that polyalphaolefin ("RT2780") is used instead of polyalphaolefin ("RT2585"). In addition, a sample for evaluating bleeding and electrical field dependence of the electrical resistance is obtained.

Example D7

An unvulcanized rubber composition is prepared and a roll member is obtained using the composition in the same manner as in Example D3 except that polyalphaolefin ("RT2780") is used instead of polyalphaolefin ("RT2585"). In addition, a sample for evaluating bleeding and electrical field dependence of the electrical resistance is obtained.

Example D8

An unvulcanized rubber composition is prepared and a roll member is obtained using the composition in the same manner as in Example D1 except that NBR (acrylonitrile butadiene rubber, trade name "DN3355" manufactured by Nippon Zeon Co., Ltd.) is used instead of the rubber material and 2.0 parts by weight of the ionic conductive agent (LXN-30) is used. In addition, a sample for evaluating bleeding and electrical field dependence of the electrical resistance is obtained.

Example D9

An unvulcanized rubber composition is prepared and a roll member is obtained using the composition in the same manner as in Example D1 except that EPDM (ethylene propylene terpolymer, trade name "EPT4021" manufactured by Mitsui Chemicals Co., Ltd.) is used instead of the rubber material and 2.0 parts by weight of the ionic conductive agent (LXN-30) is used. In addition, a sample for evaluating bleeding and electrical field dependence of the electrical resistance is obtained.

Example D10

An unvulcanized rubber composition is prepared and a roll member is obtained using the composition in the same manner as in Example D1 except that calcium carbonate surface-treated with fatty acid having a BET specific surface area of 11 $m^2/g$ (trade name "Vigot-15" manufactured by Shiraishi Industry Co., Ltd.) is used instead of the silica. In addition, a sample for evaluating bleeding and electrical field dependence of the electrical resistance is obtained.

Example D11

An unvulcanized rubber composition is prepared and a roll member is obtained using the composition in the same manner as in Example D10 except that calcium carbonate having a BET specific surface area of 13 $m^2/g$ (trade name "Vigot-10" manufactured by Shiraishi Industry Co., Ltd.) is used as the calcium carbonate. In addition, a sample for evaluating bleeding and electrical field dependence of the electrical resistance is obtained.

Example D12

An unvulcanized rubber composition is prepared and a roll member is obtained using the composition in the same manner as in Example D10 except that calcium carbonate having a BET specific surface area of 18 $m^2/g$ (trade name "White calcium carbonate CCR" manufactured by Shiraishi Industry Co., Ltd.) is used as the calcium carbonate. In addition, a sample for evaluating bleeding and electrical field dependence of the electrical resistance is obtained.

Example D13

An unvulcanized rubber composition is prepared and a roll member is obtained using the composition in the same manner as in Example D10 except that calcium carbonate having a BET specific surface area of 26 $m^2/g$ (trade name "White calcium carbonate CC" manufactured by Shiraishi Industry Co., Ltd.) is used as the calcium carbonate. In addition, a sample for evaluating bleeding and electrical field dependence of the electrical resistance is obtained.

Example D14

An unvulcanized rubber composition is prepared and a roll member is obtained using the composition in the same manner as in Example D10 except that calcium carbonate having a BET specific surface area of 30 $m^2/g$ (trade name "Viscoexcel-30" manufactured by Shiraishi Industry Co., Ltd.) is used as the calcium carbonate. In addition, a sample for evaluating bleeding and electrical field dependence of the electrical resistance is obtained.

Example D15

An unvulcanized rubber composition is prepared and a roll member is obtained using the composition in the same manner as in Example D10 except that calcium carbonate surface-treated with rosin acid having a BET specific surface area of 34 $m^2/g$ (trade name "White calcium carbonate AA" manufactured by Shiraishi Industry Co., Ltd.) is used as the calcium carbonate. In addition, a sample for evaluating bleeding and electrical field dependence of the electrical resistance is obtained.

Example D16

An unvulcanized rubber composition is prepared and a roll member is obtained using the composition in the same manner as in Example D10 except that calcium carbonate surface-treated with aminosilane having a BET specific surface area of 70 m$^2$/g (trade name "ACTIFORT 700" manufactured by Shiraishi Industry Co., Ltd.) is used as the calcium carbonate. In addition, a sample for evaluating bleeding and electrical field dependence of the electrical resistance is obtained.

Example D17

An unvulcanized rubber composition is prepared and a roll member is obtained using the composition in the same manner as in Example D14 except that 20 parts by weight of the calcium carbonate is used. In addition, a sample for evaluating bleeding and electrical field dependence of the electrical resistance is obtained.

Example D18

An unvulcanized rubber composition is prepared and a roll member is obtained using the composition in the same manner as in Example D14 except that 30 parts by weight of the calcium carbonate is used. In addition, a sample for evaluating bleeding and electrical field dependence of the electrical resistance is obtained.

Example D19

An unvulcanized rubber composition is prepared and a roll member is obtained using the composition in the same manner as in Example D14 except that 60 parts by weight of the calcium carbonate is used. In addition, a sample for evaluating bleeding and electrical field dependence of the electrical resistance is obtained.

Example D20

An unvulcanized rubber composition is prepared and a roll member is obtained using the composition in the same manner as in Example D14 except that 80 parts by weight of the calcium carbonate is used. In addition, a sample for evaluating bleeding and electrical field dependence of the electrical resistance is obtained.

Example D21

An unvulcanized rubber composition is prepared and a roll member is obtained using the composition in the same manner as in Example D14 except that 100 parts by weight of the calcium carbonate is used. In addition, a sample for evaluating bleeding and electrical field dependence of the electrical resistance is obtained.

Example D22

An unvulcanized rubber composition is prepared and a roll member is obtained using the composition in the same manner as in Example D10 except that calcium carbonate not surface-treated having a BET specific surface area of 12 m$^2$/g (trade name "Brilliant-15" manufactured by Shiraishi Industry Co., Ltd.) is used as the calcium carbonate. In addition, a sample for evaluating bleeding and electrical field dependence of the electrical resistance is obtained.

Example D23

An unvulcanized rubber composition is prepared and a roll member is obtained using the composition in the same manner as in Example D17 except that 40 parts by weight of a total of two types of calcium carbonate, including 20 parts by weight of calcium carbonate having a BET specific surface area of 2 m$^2$/g (trade name "whiton P-50" manufactured by "Togo Fine Chemical Co., Ltd.") as well as 20 parts by weight of calcium carbonate used in Example D17 is used. In addition, a sample for evaluating bleeding and electrical field dependence of the electrical resistance is obtained.

Comparative Example D1

An unvulcanized rubber composition is prepared and a roll member is obtained using the composition in the same manner as in Example D1 except that polyalphaolefin ("RT2585") is not mixed. In addition, a sample for evaluating bleeding is obtained.

Comparative Example D2

An unvulcanized rubber composition is prepared and a roll member is obtained using the composition in the same manner as in Example D1 except that the polyalphaolefin ("RT2585") is displaced by a softener (paraffin process oil, trade name "Diana process oil PW-90", manufactured by Idemitsu Kosan Co., Ltd.). In addition, a sample for evaluating bleeding and electrical field dependence of the electrical resistance is obtained.

Comparative Example D3

An unvulcanized rubber composition is prepared and a roll member is obtained using the composition in the same manner as in Example D1 except that the polyalphaolefin ("RT2585") is displaced by a plasticizer (adipic acid ether ester-based plasticizer, trade name "RS107", manufactured by ADEKA Corporation). In addition, a sample for evaluating bleeding and electrical field dependence of the electrical resistance is obtained.

Example D24

An unvulcanized rubber composition is prepared and a roll member is obtained using the composition in the same manner as in Example D1 except that calcium carbonate having a BET specific surface area of 6 m$^2$/g (trade name "whiton P-10" manufactured by "Toyo Fine Chemical Co., Ltd.") is used instead of the silica. In addition, a sample for evaluating bleeding and electrical field dependence of the electrical resistance is obtained.

Example D25

An unvulcanized rubber composition is prepared and a roll member is obtained using the composition in the same manner as in Example D1 except that calcium carbonate having a BET specific surface area of 90 m$^2$/g (trade name "Poronex" manufactured by "Maruo Calcium Co., Ltd.") is used instead of the silica. In addition, a sample for evaluating bleeding and electrical field dependence of the electrical resistance is obtained.

Example D26

An unvulcanized rubber composition is prepared and a roll member is obtained using the composition in the same manner as in Example D10 except that 15 parts by weight of the calcium carbonate is used. In addition, a sample for evaluating bleeding and electrical field dependence of the electrical resistance is obtained.

Example D27

An unvulcanized rubber composition is prepared and a roll member is obtained using the composition in the same manner as in Example D10 except that 120 parts by weight of the calcium carbonate is used. In addition, a sample for evaluating bleeding and electrical field dependence of the electrical resistance is obtained.

<Evaluation>

Respective Examples are evaluated as follows. The results thus obtained are shown in Table 5.

[Measurement of Die Swelling]

A slab rubber is extruded using a rubber extruder such that the core is not passed through the extruder and the swelling ratio with respect to the die aperture is measured.

Measurement method of die swelling

The slab rubber is cut to about 1 m, allowed to stand under laboratory environment for one day, the length and weight of the slab rubber are measured and variation in a cross-sectional area is measured in accordance with the following equation.

$$DS(\%) = (W/(l\rho S_0) - 1) \times 100 \quad \text{Equation}$$

wherein DS represents die swelling, W represents the weight of the slab rubber (based on g), l represents the length of the slab rubber (based on cm), $\rho$ represents the specific gravity of the slab and $S_0$ represents a cross-sectional area of a die (based on $cm^2$).

—Evaluation Criteria—

AA: equal to or lower than 20%
A: higher than 20% and equal to or lower than 30%
B: higher than 30% and equal to or lower than 40%
C: higher than 40% and equal to or lower than 50%
CC: higher than 50%

[Measurement of Terminal Protrusion Level of Elastic Layer]

An axial outer diameter of the roll member is measured using a laser outer diameter meter, and a level in which the end portion of the elastic layer (axial end portion of the roll member) is contracted and thus tilted is evaluated from a difference between the outer diameter of the axial end portion and the outer diameter of the axial central portion of the roll member.

—Evaluation Criteria—

AA: equal to or less than 200 μm
A: more than 200 μm and equal to or less than 300 μm
B: more than 300 μm and equal to or less than 500 μm
C: more than 500 μm

[Evaluation of Bleeding]

The samples for evaluating bleeding are suspended in the air in an environmental test laboratory of room temperature of 45° C. and humidity of 90% and allowed to stand for 7 days, subsequently, in an environmental test laboratory of room temperature of 23° C. and humidity of 50%, silica sand (No. 6) is scattered on the surface of the sample for evaluating bleeding and then wiped off lightly with a brush and bleeding is evaluated from an area of silica sand attached to the surface of the sample for evaluating bleeding (attachment ratio of silica sand).

—Evaluation Criteria—

AA: equal to or higher than 0% and lower than 15%
A: equal to or higher than 15% and lower than 30%
B: equal to or higher than 30% and lower than 45%
C: equal to or higher than 45%

[Measurement of Surface Roughness of Elastic Layer]

A surface roughness Rz of the roll member surface (elastic layer surface) is obtained by measuring roughness in a circumferential direction using a roughness meter (SURFCOM 1500DX-12: manufactured by Tokyo Seimitsu Co., Ltd.) and averaging the roughness.

In addition, the roughness Rz of surface is obtained by measuring the roughness in the axial direction of the roll member in accordance with JISB0601-1994 using the meter under conditions of a measured length of 4.0 mm, a cut-off value of 0.8 and a measurement rate of 0.30 mm/sec, at points positioned mm from both axial ends of the roll member and three points of axially central parts which are equally divided, based on the points positioned 5 mm from both axial ends thereof and averaging the values.

—Evaluation Criteria—

AA: roughness Rz lower than 10 μm,
A: roughness Rz equal to or higher than 10 μm and lower than 15 μm,
B: roughness Rz equal to or higher than 15 μm to lower than 20 μm,
C: roughness Rz equal to or higher than 20 μm.

[Measurement of Electrical Field Dependence of the Electrical Resistance]

The sample for electrical field dependence of the electrical resistance is seasoned under conditions of 22° C. and 55% for 24 hours or longer and measurement is performed in accordance with JIS K6911 using an R8340A digital ultra-high resistance/micro current meter (manufactured by ADC Co., Ltd.), UR probe MCP-HTP12 having a double-ring electrode structure in which the connect part thereof is modified for R8340A, and resitable UFL MCP-ST03 (all, manufactured by Dia Instruments Co., Ltd.).

The R10 at an applied voltage of 10 V and R500 at an applied voltage of 500 V are measured for a charge time of 2 secs and a discharge time of 1 sec, R10-R500 is calculated in terms of common logarithm and electrical field dependence of the electrical resistance is then evaluated based on the following criteria.

AA: R10-R500 in terms of common logarithm equal to lower than 0.3 log Ωcm
A: R10-R500 in terms of common logarithm higher than 0.3 log Ωcm and equal to lower than 0.4 log Ωcm
B: R10-R500 in terms of common logarithm higher than 0.4 log Ωcm and equal to lower than 0.5 log Ωcm
C: R10-R500 in terms of common logarithm higher than 0.5 log Ωcm

TABLE 5

Evaluation results of Example D

| | Die swelling | Surface roughness Rz of elastic layer | Terminal protrusion level of elastic layer | Bleeding | Electrical field dependence of the electrical resistance |
|---|---|---|---|---|---|
| Ex. D1 | A | AA | B | AA | AA |
| Ex. D2 | B | A | B | AA | AA |
| Ex. D3 | A | AA | A | AA | AA |
| Ex. D4 | A | A | B | AA | AA |
| Ex. D5 | B | AA | A | AA | AA |
| Ex. D6 | A | A | B | AA | AA |

TABLE 5-continued

Evaluation results of Example D

| | Die swelling | Surface roughness Rz of elastic layer | Terminal protrusion level of elastic layer | Bleeding | Electrical field dependence of the electrical resistance |
|---|---|---|---|---|---|
| Ex. D7 | B | AA | B | AA | AA |
| Ex. D8 | A | AA | B | AA | AA |
| Ex. D9 | A | AA | B | AA | AA |
| Ex. D10 | A | A | A | AA | AA |
| Ex. D11 | A | A | A | AA | AA |
| Ex. D12 | A | AA | A | AA | AA |
| Ex. D13 | A | AA | A | AA | AA |
| Ex. D14 | AA | AA | AA | AA | AA |
| Ex. D15 | AA | AA | AA | AA | AA |
| Ex. D16 | AA | AA | AA | AA | AA |
| Ex. D17 | B | AA | B | AA | AA |
| Ex. D18 | A | AA | A | AA | AA |
| Ex. D19 | AA | AA | AA | AA | AA |
| Ex. D20 | AA | A | AA | AA | AA |
| Ex. D21 | AA | B | AA | AA | AA |
| Ex. D22 | A | B | A | AA | AA |
| Ex. D23 | B | A | B | AA | AA |
| Comp. Ex. D1 | CC | C | C | AA | AA |
| Comp. Ex. D2 | CC | B | C | C | AA |
| Comp. Ex. D3 | CC | B | C | C | AA |
| Ex. D24 | A | AA | A | AA | AA |
| Ex. D25 | B | B | B | AA | AA |
| Ex. D26 | B | AA | B | AA | AA |
| Ex. D27 | AA | C | AA | AA | AA |

As can be seen from the results above, Examples exhibit superior die swelling, terminal protrusion level due to rubber contraction of the elastic layer, and bleeding, as compared to Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A roll member comprising:
a core, and
an elastic layer arranged on the core, the elastic layer comprising a rubber material having a halogen group and a polyalphaolefin,
wherein the polyalphaolefin is a copolymer of propylene and ethylene or a polymer including butene,
wherein the elastic layer further comprises calcium carbonate having a BET specific surface area of from about 11 $m^2/g$ to about 70 $m^2/g$, in addition to carbon black,
wherein the calcium carbonate is from 20 parts by weight to 100 parts by weight, based on 100 parts by weight of the rubber material,
wherein the elastic layer further comprises at least one selected from the group consisting of quinoxaline and triazine compounds,
wherein the triazine compounds include at least one selected from the group consisting of 2,4,6-trimercapto-1,3,5-triazine, 1-methoxy-3,5-dimercapto triazine, 1-hexyl amino-3,5-dimercapto triazine, 1-diethyl amino-3,5-dimercapto triazine, 1-cyclohexyl amino-3,5-dimercapto triazine, 1-dibutyl amino-3,5-dimercapto triazine, 2-anilino-4,6-dimercapto triazine, and 1-phenyl amino-3,5-dimercapto triazine, and
wherein the calcium carbonate has been surface treated with at least one of a fatty acid, a metal salt of a fatty acid, an alkaline earth metal salt of a fatty acid, or an ester.

2. The roll member according to claim 1, wherein the content of the polyalphaolefin is from about 1 part by weight to about 40 parts by weight, based on 100 parts by weight of the rubber material.

3. The roll member according to claim 1, wherein the content of the polyalphaolefin is from about 3 parts by weight to about 30 parts by weight, based on 100 parts by weight of the rubber material.

4. The roll member according to claim 1, wherein the content of the polyalphaolefin is from about 5 parts by weight to about 20 parts by weight, based on 100 parts by weight of the rubber material.

5. The roll member according to claim 1, wherein the elastic layer further comprises carbon black having a DBP oil absorption amount of from about 42 ml/100 g to about 175 ml/100 g.

6. The roll member according to claim 1, wherein the elastic layer further comprises carbon black having a DBP oil absorption amount of from about 60 ml/100 g to about 150 ml/100 g.

7. The roll member according to claim 1, wherein the elastic layer further comprises carbon black having a DBP oil absorption amount of from about 85 ml/100 g to about 130 ml/100 g.

8. The roll member according to claim 1, wherein the rubber material is a rubber material having a halogen group.

9. The roll member according to claim 1, wherein the elastic layer further comprises at least one selected from organic peroxides.

10. A charging unit comprising the roll member according to claim 1.

11. A process cartridge detachable from an image forming apparatus, comprising:
an image holding member; and
the charging unit according to claim 10, that charges the image holding member.

12. An image forming apparatus, comprising:
an image holding member;
the charging unit according to claim 10, that charges the image holding member;
a latent image forming unit that forms an electrostatic latent image on the image holding member charged by the charging unit;
a developing unit that develops the electrostatic latent image formed on the image holding member using a developer comprising a toner; and
a transfer unit that transfers the toner image formed on the image holding member to a recording medium.

13. The roll member according to claim 1, wherein the calcium carbonate is from 30 parts by weight to 80 parts by weight, based on 100 parts by weight of the rubber material.

14. The roll member according to claim 1, wherein the calcium carbonate is from 40 parts by weight to 60 parts by weight, based on 100 parts by weight of the rubber material.

* * * * *